US012764544B2

(12) United States Patent
Morchon

(10) Patent No.: US 12,764,544 B2
(45) Date of Patent: Oct. 13, 2026

(54) METHOD FOR OPERATING A CELLULAR NETWORK

(71) Applicant: KONINKLIJKE PHILIPS N.V., Eindhoven (NL)

(72) Inventor: Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 378 days.

(21) Appl. No.: 18/277,783

(22) PCT Filed: Feb. 22, 2022

(86) PCT No.: PCT/EP2022/054294

§ 371 (c)(1),
(2) Date: Aug. 18, 2023

(87) PCT Pub. No.: WO2022/175538

PCT Pub. Date: Aug. 25, 2022

(65) Prior Publication Data

US 2024/0129746 A1 Apr. 18, 2024

(30) Foreign Application Priority Data

Feb. 22, 2021 (EP) .................................... 21158459
Apr. 29, 2021 (EP) .................................... 21171104
(Continued)

(51) Int. Cl.
*H04W 12/50* (2021.01)
*H04W 12/041* (2021.01)
(Continued)

(52) U.S. Cl.
CPC ......... *H04W 12/50* (2021.01); *H04W 12/041* (2021.01); *H04W 12/0471* (2021.01); *H04W 76/10* (2018.02)

(58) Field of Classification Search
CPC ............... H04W 12/50; H04W 12/041; H04W 12/0471; H04W 76/10; H04W 12/037;
(Continued)

(56) References Cited

U.S. PATENT DOCUMENTS

2022/0109996 A1* 4/2022 Lee ....................... H04W 12/50
2023/0370839 A1* 11/2023 Wifvesson .......... H04W 12/041
2023/0379168 A1* 11/2023 Fu ....................... H04W 12/069

OTHER PUBLICATIONS

ZTE et al: "Security for Relay Service Code", 3GPP Draft; S3-152275-CR0090-SECURITY for Relay Service Code, 3rd Generation Partnership Project (3GPP), Mobile Competence Centre ; 650, Route Des Lucioles ; F-06921 Sophia-Antipolis Cedex ; France vol. SA WG3, No. Anaheim, US; Nov. 9, 2015-Nov. 13, 2015 Nov. 2, 2015 (Nov. 2, 2015).

(Continued)

*Primary Examiner* — Mazda Sabouri

(57) ABSTRACT

The invention relates to a method for operating a communication system including a primary station linked to a Core Network, said primary station serving a cell, a relay station served by the primary station and a secondary station served by the primary station, the method comprising the steps of the relay station establishing a connection with the primary station, including receiving in at least one first secure message from the primary station a first set of configuration parameters, the secondary station establishing a connection with the primary station, including receiving from the primary station in at least one second secure message a second set of configuration parameters linked to an upcoming data session, the relay station transmitting at least one transmitted service code from the first set, the secondary station establishing a direct communication with the relay station upon determination that the transmitted configuration parameters is included in the second set.

20 Claims, 9 Drawing Sheets

(30) Foreign Application Priority Data

| | | |
|---|---|---|
| Aug. 18, 2021 | (EP) | 21191991 |
| Sep. 7, 2021 | (EP) | 21195383 |
| Feb. 7, 2022 | (EP) | 22155346 |
| Feb. 20, 2022 | (EP) | 22157641 |

(51) Int. Cl.
*H04W 12/0471* (2021.01)
*H04W 76/10* (2018.01)

(58) Field of Classification Search
CPC ... H04W 12/069; H04W 88/04; H04W 12/08; H04W 76/14; H04L 63/0807
See application file for complete search history.

(56) References Cited

OTHER PUBLICATIONS

"3rd Generation Partnership Project; Technical Specification Group Services and System Aspects; Study on Security issues to support Proximity Services (ProSe) (Release 13)", 3GPP Draft; S3-152079_TR33.833V1_5_0_CL, 3rd Generation Partnership Project (3GPP), Mobile Competence Centre; 650, Route Des Lucioles; F-06921 Sophia.

International Search Report and Written Opinion from PCT/EP2022/054294 mailed Jun. 1, 2022.

Universal Mobile Telecommunications System TS33.303 (Jul. 2017).

* cited by examiner

METHOD FOR OPERATING A CELLULAR NETWORK

CROSS REFERENCE TO RELATED APPLICATIONS

This application is a U.S. national phase application of International Application No. PCT/EP2022/054294 filed on Feb. 22, 2022, which claims the benefit of EP Application Serial No. 21158459.4 filed on Feb. 22, 2021 and EP Application Serial No. 21171104.9 filed on Apr. 29, 2021 and EP Application Serial No. 21191991.5 filed on Aug. 18, 2021 and EP Application Serial No. 21195383.1 filed on Sep. 7, 2021 and EP Application Serial No. 21155346.4 filed on Feb. 7, 2022 and EP Application Serial No. 22157641.6 filed on Feb. 20, 2022 and are incorporated herein by reference.

FIELD OF THE INVENTION

The present invention relates to the field of wireless communications, and in particular to relaying architectures in the context of cellular networks, like the UMTS Long Term Evolution (LTE) or LTE Advanced (both included in 4G), New Radio (NR) (5G) or other cellular networks or mobile communication networks.

BACKGROUND OF THE INVENTION

In conventional cellular networks, a primary station serves a plurality of secondary stations located within a cell served by this primary station. Wireless communication from the primary station towards each secondary station is done on downlink channels. Conversely, wireless communication from each secondary station towards the primary station is done on uplink channels. The wireless communication can include data traffic (sometimes referred to User Data), and control information (also referred sometimes as signalling). This control information typically comprises information to assist the primary station and/or the secondary station to exchange data traffic (e.g. resource allocation/requests, physical transmission parameters, information on the state of the respective stations).

In the context of cellular networks as standardized by 3GPP, the primary station is referred to a base station, or a gNodeB (or gNB) in 5G (NR) or an eNodeB (or eNB) in 4G (LTE). The eNB/gNB is part of the Radio Access Network RAN, which interfaces to functions in the Core Network (CN). In the same context, the secondary station corresponds to a mobile station, or a User Equipment (or a UE) in 4G/5G, which is a wireless client device or a specific role played by such device. The term "node" is also used to denote either a UE or a gNB/eNB.

In the 3GPP, it has been introduced the role of a relay node as shown on FIG. 1. This relay node 120 is a wireless communication station 120 that includes functionalities for relaying communication between a base station 100 and a UE 110. This relay function for example helps to extend the coverage of a cell 10 to an out-of-coverage (OoC) mobile station 110. This relay node 120 may be a mobile station or could be a different type of device. In the specifications for 4G, the Proximity Services (ProSe) functions are defined inter alia in TS23.303, and TS24.334 to enable—amongst others—connectivity for the cellular User Equipment (UE) 110 that is temporarily not in coverage of the cellular network base station (eNB) 100 serving the cell 10. This particular function is called ProSe UE-to-network relay, or Relay UE for short. The Relay UE 120 relays application and network traffic in two directions between the OoC UE 110 and the eNB 100. The local communication between the Relay UE 120 and the OoC UE 110 is called device-to-device (D2D) communication or Sidelink (also known as PC5) communication in TS23.303 and TS24.334. Once the relaying relation is established, the OoC-UE 110 is IP-connected via the Relay UE 120 and acts in a role of "Remote UE" 110. This situation means the Remote UE has an indirect network connection TS22.261 to selected functions of the Core Network as opposed to a direct network connection TS22.261 to all Core Network functions that is the normal case.

Additionally, in such systems, as depicted on FIG. 2:

A) a remote UE can talk to a base station/core network over a UE-to-Network relay.

B) a source UE can talk to a destination UE over a UE-to-UE relay.

C) a group of UEs can talk to each other in groupcast communication, sometimes over a UE-to-UE relay.

In 3GPP SA2, communication models and procedures are being discussed and agreed for relay-based systems. These procedures are included in TR 23.752. In 3GPP SA3, security solutions and procedures are being discussed and agreed for relay-based systems. These procedures are included in TR 33.847.

For instance, Solution #28 in TR 23.752 describes a mechanism for the Remote UE to discover a Layer-3 UE-to-Network Relay and establish a PC5 unicast connection with a UE-to-Network relay. This mechanism does not require interaction with the core network during operation.

For instance, Solution #32 in TR 33.847 describes a mechanism for the Remote UE to protect its PDU parameters from the UE-to-Network relays so that only authorized relays have access to them. This solution requires interaction with the core network.

The current solution discussed in Solution #28 in TR 23.752 presents the advantage that it does not require interaction with the CN during discovery. However, it also presents some problems, for example related to KI #16 in TR 33.847. It has not been solved how to avoid the pre-configuration of slicing information (problem 1). Also, this solution requires the PDU session parameters being transported in the clear (problem 2). A possible solution to these issues in TR 33.847 is Solution #32. However, this solution requires communication over the core network in the course of the operation (problem 3) in order to achieve the protection of privacy of PDU parameters.

SUMMARY OF THE INVENTION

One aim of the present invention is to alleviate the above-mentioned problems.

Another aim of the present invention is to propose a method for communicating in a network that allows a secure set up for the establishment of a protocol data unit (PDU) session for a secondary station.

Still another aim of the invention is to propose a method of a secondary station for communicating in a network which requires minimal interaction with the Core Network once in operation.

To this end, it is proposed in accordance with a first aspect of the invention, it is proposed a method for operating a system as claimed in claim 1, and its variants in the dependent claims.

Thus, in accordance with the first aspect of the invention, the secondary station and the relay station gets the required security elements from the Core Network, e.g., a signed public key bound to the receiving UE, at an early stage, for example in the initial connection to the cell. In a later phase, for example during the operation of the network, the secondary station and the relay station can establish a secure exchange and authentication for starting a PDU session.

In exemplary embodiments described in the following, the configuration parameters included in the first message and in the second message can be Relay Service Codes (RSCs). However, these configuration parameters may also be different parameters or a combination of parameters such as any one or more of the following:

- a set of access roles;
- Set of attributes;
- Communication parameters, such as transmission modes, restrictions on some sets of resources;
- special identifiers, such as IDs for application, group ID, UEs;
- Policies defining access rights
- Policies defining types of communications that can be relayed In accordance with a sixth aspect of the invention, it is proposed a computer program product comprising code means for producing the steps of the method of the first second or third aspects of the invention when run on a computer device.

Thus, in accordance to the first aspect of the invention, it is proposed a method for operating a communication system including a primary station linked to a Core Network, said primary station serving a cell, a relay station served by the primary station and a secondary station served by the primary station, the method comprising the steps of

- the relay station establishing a connection with the primary station, including receiving in at least one first secure message from the primary station a first set of configuration parameter rs including service codes,
- the secondary station establishing a connection with the primary station, including receiving from the primary station in at least one second secure message a second set of configuration parameters, including relay service codes linked to an upcoming data session,
- the relay station transmitting at least one transmitted service code from the first set,
- the secondary station establishing a direct communication with the relay station upon determination that the transmitted service code is included in the second set.

In accordance with the second aspect of the invention, it is proposed a method for operating a relay station adapted for communicating in a network, including a primary station linked to a Core Network, said primary station serving a cell, and a secondary station served by the primary station, wherein the relay station is served by the primary station, the method comprising the steps of

- the relay station establishing a connection with the primary station, including receiving in at least one first secure message from the primary station a first set of configuration parameters including a number of attributes or a set of service codes,
- the relay station transmitting at least one attribute from the second set of configuration parameters or a transmitted service code from the second set of configuration parameters,
- the relay station establishing a direct communication with the secondary station upon request from the secondary station, said request being based on the transmitted service message.

In accordance with the third aspect of the invention, it is proposed a method for operating a secondary station adapted for communicating in a communication system including a primary station linked to a Core Network, said primary station serving a cell, a relay station served by the primary station, wherein the secondary station is served by the primary station, the method comprising the steps of

- the secondary station establishing a connection with the primary station, including receiving from the primary station in at least one second secure message a public encryption key, and a second set of attributes or relay service codes linked to an upcoming data exchange with at least one relay station,
- the secondary station receiving at least one transmitted attribute or relay service code from the relay station,
- the secondary station determining whether the transmitted attribute or service code is included in the second set of configuration parameters and establishing a direct communication with the relay station upon determination that the transmitted attribute or service code is included in the second set of configuration parameters or fulfils a policy.

In accordance with the fourth aspect of the invention, it is proposed a relay station adapted for communicating in a network, including a primary station linked to the Core Network, said primary station serving a cell, and a secondary station served by the primary station, wherein the relay station is served by the primary station, the relay station comprising

- a transmitter,
- a receiver,
- a controller adapted to establish a connection with the primary station,
- including configuring the receiver for receiving in at least one first secure message from the primary station a first set of configuration parameters including attributes or service codes,
- the transmitter being configured for transmitting at least one transmitted attribute or service code from the first set of configuration parameters,
- wherein the controller is configured for establishing a direct communication with the secondary station using the public key upon request from the secondary station, said request being based on the transmitted service message.

In accordance with the fifth aspect of the invention, it is proposed a secondary station adapted for communicating in a communication system including a primary station linked to the Core Network, said primary station serving a cell, a relay station served by the primary station, wherein the secondary station is served by the primary station, the secondary station comprising

- a transmitter,
- a receiver,
- a controller adapted to establish a connection with the primary station, including configuring the receiver for receiving from the primary station in at least one second secure message a second set of configuration parameters including attributes or relay service codes linked to an upcoming data exchange with at least one relay station,
- the receiver being adapted for receiving at least one transmitted attribute or service code from the relay station,
- wherein the controller is configured for determining whether the transmitted attribute or service code is included in the second set of configuration parameters or fulfil a policy in it and causing the transmitter to establish a direct communication with the relay station upon determination that the transmitted service code is included in the second set.

In accordance to a first option that can be combined with any of the first to fifth aspects of the invention, the first secure message further includes a relay public encryption key and the corresponding relay private encryption key.

Similarly, according to a second option that can be combined with the first to fifth aspects of the invention or with the second option of the invention, the second secure message further includes a secondary station public encryption key, and the corresponding secondary station private encryption key.

In a third option, which can be combined with the second and/or third options, the at least one first secure message includes at least one first Core Network signature from the Core Network generated at least on the relay public encryption key and on at least an attribute of the first set of configuration parameters or one of the service codes of the first set of configuration parameters, and the at least one second secure message includes at least one second Core Network signature from the Core Network generated at least on the secondary station public encryption key, and on at least an attribute of the second set of configuration parameters or one of the service codes of the second set of configuration parameters.

Alternatively, a fourth option which can be combined with the second and/or third options, the at least one first secure message includes at least one first Core Network signature from the Core Network generated at least on the relay public encryption key and on at least an attribute of the first set of configuration parameters or one of the service codes of the first set of configuration parameters, and the at least one second secure message includes at least one second Core Network signature from the Core Network generated at least on parameters relative to the upcoming data session, said parameters being included in the second secure message, the secondary station public encryption key, and on at least an attribute of the second set of configuration parameters or one of the service codes of the second set of configuration parameters.

In a fifth option of the invention which can be combined with the third or the fourth options, the step of establishing a direct communication includes:

a. the secondary station sending a direct communication request to the relay station,
b. the relay station responding to the direct communication request by a response message including the relay public encryption key, the first Core Network signature, and a response message signature,
c. the secondary station checking the first Core Network signature included in the response message and the response message signature.

Further to the fifth option which can be combined with the fourth option, the direct communication request includes a secondary station nonce, and wherein the response message signature is generated by applying the relay private encryption key on at least the secondary station nonce.

In addition, in a sixth option which can be combined with the fifth option, the response message signature is generated by applying the relay private encryption key on at least the secondary station nonce, and at least one of the Core Network first signature, the relay public encryption key.

In a seventh option to be combined with the fourth, fifth or sixth option, the response message further includes a relay nonce, and wherein the secondary station transmits communication parameters in a configuration message, said configuration message including a configuration message signature, said configuration message signature being generated by applying the secondary station private encryption key on at least the relay nonce.

In an eighth option to be combined with the seventh option, said configuration message signature is generated by applying the secondary station private encryption key on at least the relay nonce, and at least one of the Core Network second signature, the secondary station public encryption key.

In a ninth option which can be combined with the first to fifth aspects of the invention, wherein the step of establishing a direct communication includes:

a. the secondary station generating or selecting a secondary station encryption public key, a secondary station encryption private key and a secondary station nonce, sending a direct communication request to the relay station,
b. the relay station responding to the direct communication request by a response message including a relay public encryption key and/or a first Core Network signature and/or and a response message signature where this response message is encrypted using the public key received in step a.
c. the secondary station decrypting the response message and checking the first Core Network signature included in the response message and the response message signature.

In a tenth option which can be combined with any of the aspects and options of the invention, the relay station transmitting the at least one transmitted attribute of the first set of configuration parameters or a service code from the first set of configuration parameters and at least one of the following further information: a data session policy, a data session parameter, the first Core Network signature, a relay public encryption key, and wherein the secondary station establishing a direct communication with the relay station upon determination that the transmitted attribute of the first set of configuration parameters or the transmitted service code is included in the second set of configuration parameters and that the further information is compatible for the upcoming data session.

In an eleventh option to be combined with the tenth option, the transmitted message from the relay station includes a signature applied at least on a time stamp.

In a twelfth option of the invention which can be combined with any of the aspects and options of the invention, the at least one transmitted service code from the first set of configuration parameters is the result of a hashed service code of the first set combined with a transmit nonce, and the relay station further transmit the transmit nonce.

In a thirteenth option of the invention which can be combined with the fifth to tenth options, the method further comprises the secondary station informing the Core Network if the checking of the first Core Network signature fails.

In a fourteenth option, to be combined with the first to fifth aspects of the invention, the relay station establishing a connection with the primary station includes the relay station generating a relay public encryption key and relay private encryption key, sending the relay public encryption key to the primary station for signature by the Core Network, and receiving in the at least one first secure message from the primary station the first set of service codes and a first Core Network Signature based on at least the relay public encryption key.

In a fifteenth option of the invention to be combined with the first to fifth aspects of the invention or with the fourteenth option, the secondary station establishing a connection with the primary station includes the secondary station generating a secondary station public encryption key and a secondary station private encryption key, sending the secondary public encryption key to the primary station for signature by the Core Network, and receiving in the at least one second secure message from the primary station the second set of service codes and a second Core Network Signature based on at least the secondary station public encryption key.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the wireless device, the system, the relay station, the cell station and the method may have similar, corresponding and/or identical preferred embodiments, in particular, as defined in the dependent claims.

It shall be understood that a preferred embodiment of the invention can also be any combination of the dependent claims or above embodiments with the respective independent claim. These and other aspects of the invention will be apparent from and elucidated with reference to the embodiments described hereinafter.

DETAILED DESCRIPTION

Figure 1:
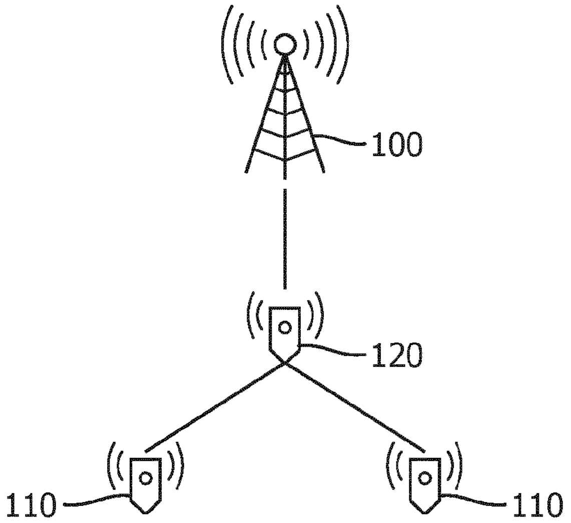
FIG. 1, already described, schematically represents a cellular system in which the invention is implemented.
Figure 2:
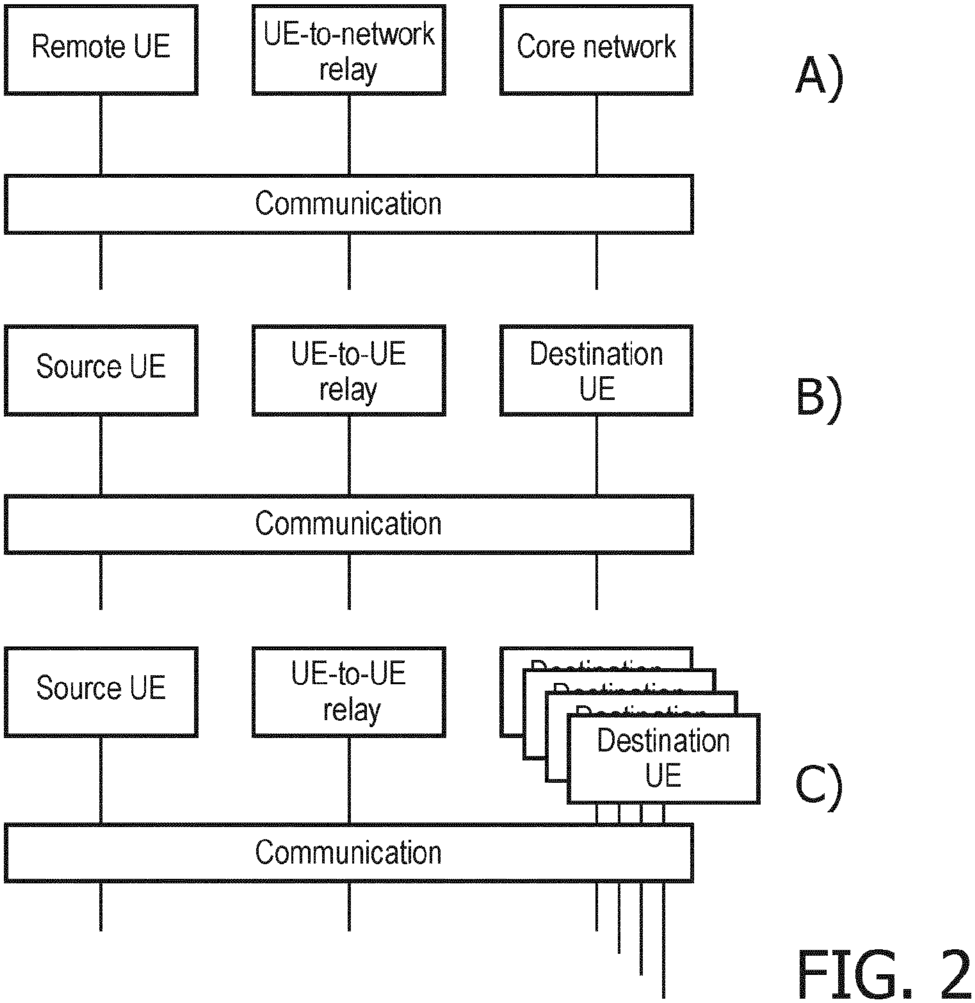
FIG. 2, already described, schematically represents different possible modes of operation in the network of FIG. 1.

In the following description, solutions addressing problems 1, 2, and 3 are described in various embodiments. These solutions involve in a first embodiment the distribution of information—in particular, a public key bound to each UE (secondary station, also referred to as Remote UE and the relay station, also referred to as a Relay UE)—signed by the CN to each UE. This distribution of information phase happens during the initial provisioning and authorization step, i.e. at an early stage of the connection. The UE can be a Remote UE or a Relay UE. It is also possible that in operation, a considered UE may have to operate alternatively as a Relay UE and as Remote UE. The signed information, including a public key, allows in this first embodiment:

- Remote UE to check whether the Relay UE is authorized to act as a relay without accessing the CN during operation.
- Relay UE to verify the PDU parameters of the remote UE, if authorized without accessing the CN during operation.
- Remote UE and Relay UE to establish a secure PC5 link without accessing the CN during operation.

The main benefit of this first embodiment of the invention compared with existing security solutions (Solution #28 in TR 23.752 and Solution #32 in TR 33.847) is that it does not require access to the core network during operation while it operates in a secure way. This means that:

- The workload on the core network is lower,
- The latency for the establishment of the communication link is reduced, since there is no need for further checks with the CN once in operation,
- The Relay UE can be out-of-coverage
- The Remote UE can be out-of-coverage
- Privacy related parameters are not disclosed.

This first embodiment thus offers a solution that is applicable to Solution #28 in TR 23.752 to address the privacy concerns around problems 1 and 2.

Besides, although this first embodiment is described in the context of protection of PDU parameters in the context of KI #16 in TR 33.847, the same techniques and other embodiments building on them can be used to address other problems, for instance, as described in the table below. The detailed description includes multiple embodiments providing solutions to these problems. In particular, it provides improvements to Solution #8 and Solution #31 in TR 33.847. These two solutions are the only ones using public key cryptography in TR 33.847. Solution #8 and Solution #31 address KI #6 and KI #7 respectively.

| Use case | Problem in TR 33.847 | Problem title |
|---|---|---|
| UE-to-Network relay | KI#4 | Authorization in the UE-to-Network relay |
| | KI#9 | Key management in 5G Proximity Services for UE-to-Network relay communication |
| | KI#11 | UE identity protection during ProSe discovery |
| UE-to-UE Relay | KI#6 | Integrity and confidentiality of information over the UE-to-UE Relay |
| | KI#7 | authorization in the UE-to-UE relay scenario |
| | KI#12 | Security of one-to-one communication over PC5 |
| | KI#8 | Privacy of information over the UE-to-UE Relay |
| Groupcast | KI #13 | security and privacy of groupcast communication |

It is to be noted that the first embodiment of the invention is applicable to protect the confidentiality of other parameters. For instance, the Application Function address as in Solution 21 in TR 33.847.

It is to be noted that this solution can also be used—independently—for security establishment in the PC5 as alternative solution to Solutions #1, #6, #10 and #15 in TR 33.847.

The first embodiment will now be described with reference to FIG. 3. In a network similar to the one described in the preamble of this description, the CN is generally able to sign information. This can be realized by means of the Digital Signing Network Function (DSnF) proposed in Solution #20 in TR33.809. Alternatively, e.g., an application function could also be in charge of signing the required information. Additionally, the remote UEs are configured with trust anchors that allow the verification of the information when signed by the CN. These trust anchors can be as in the DSnF solution. In a variant of this first embodiment, these trust anchors could also be delivered to the UEs during the initial provisioning phase (Step 1.a and 1.b below).

The first embodiment corresponds to the ProSe operation in accordance with the "Discovery Model A". Indeed, restricted ProSe direct discovery is a process that a UE detects and identifies another UE in proximity using its Radio Access direct radio signals with explicit permission of the UE that is being discovered. In accordance with the discovery model A ("I am here"), two roles of ProSe-enabled UEs are involved in this model: Announcing UE and Monitoring UE. The announcing UE broadcasts discovery messages at pre-defined discovery intervals and the monitoring UEs that are interested in these messages read them and process them. As an alternative, in the Model B ("who is there?"/"are you there?"), two roles of ProSe-enabled UEs are involved: Discoverer UE and Discoveree UE. It is equivalent to "who is there/are you there" since the discoverer UE sends information about other UEs that would like to receive responses from, e.g. the information can be about a ProSe Application Identity corresponding to a group and the members of the group can respond.

Figure 3:
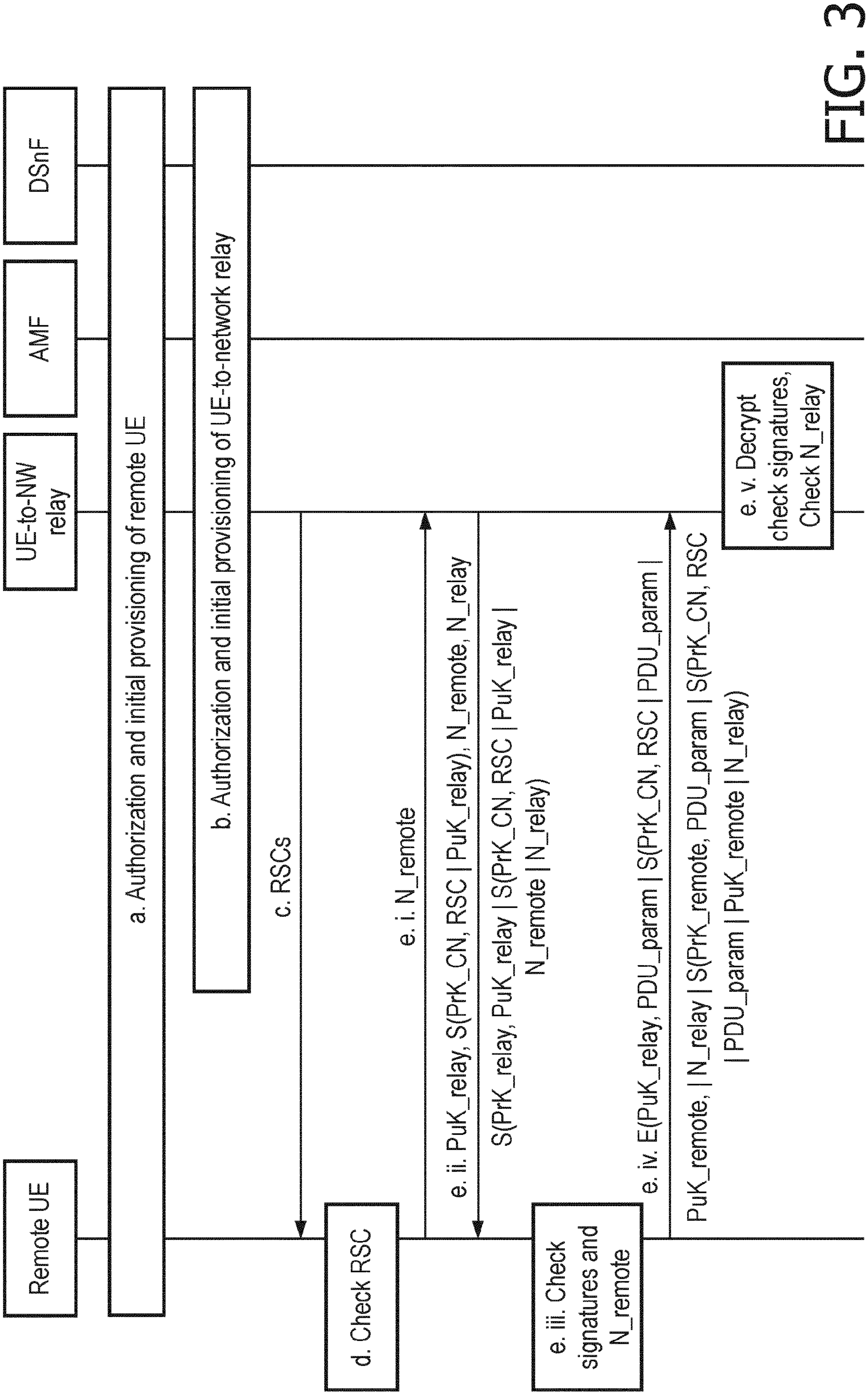
FIG. 3 is a time diagram of the communication in accordance with a protocol of a first embodiment of the invention.

In accordance with the first embodiment, as shown on FIG. 3,

At step a.: During the initial provisioning, the CN distributes to the relay UE a set of configuration parameters, for example the Relay Service Codes (RSCs) that it supports. The configuration parameters can include other capabilities offered by the relay UE, e.g., which applications it supports. This distribution can be done without disclosing to the Relay UE the specific privacy-sensitive parameters each set of configuration parameters, e.g. RSC, is linked to. The CN may also create a relay public key key pair for the Relay UE to use. The CN can also distribute other information, e.g., a policy stating which types of remote UEs or connections the relay is allowed to serve for which type of remote UEs. The CN can sign (or other security process such encryption of the message) the supported configuration parameters and the relay public key. The CN may provide the relay UE with the signed configuration parameters and relay public key, as well as with the corresponding relay private key. This can be done within a single message as shown on FIG. 3 or in separate messages in variants of this embodiment. In the case of a signature by the CN, the Core Network public key may also be shared at this time. Other encryption processes include, e.g., encrypting the whole first message, for example if the encryption keys have already been exchanged or are known by the Relay UE.

At step b. During the initial provisioning, the CN provides the remote UE with a set of configuration parameters, e.g. RSCs, linked to specific PDU session parameters. The CN also creates a secondary station public key key pair. The CN may sign the configuration parameters, the corresponding PDU parameters. It can include other elements in the signature, such as the secondary station public key. The CN may send the signed secondary station public key, RSCs, PDU parameters, and secondary station private key. In the case of a signature by the CN, the Core Network public key may also be shared at this time. The CN can also distribute other information, e.g., a policy stating which types of relays UEs are allowed to serve its communication needs. Other encryption processes include, e.g., encrypting the whole second message, for example if the encryption keys have already been exchanged or are known by the Relay UE. Also, this distribution can be performed over a single message as shown on FIG. 3 or over a plurality of messages.

At step c. in the example of Discovery Model A, the relay UE broadcasts some of the supported configuration parameters, for example its RSCs during relay UE discovery. Note that in the case of Discovery Model B, the remote UE (secondary station) would broadcasts some message to indicate its presence. Indeed, in Discovery Model B, the remote UE is the one sending discovery messages and not the relay UE. To apply the first embodiment to this alternative scenario, the Remote UE is the one sending discovery messages including its supported configuration parameters, e.g. its RSCs.

At step d, the remote UE, upon reception of the above data, checks whether the relay UE supports its PDU communication requirements for example by matching the RSC.

At step e, it is first determined if there is an RSC match, then the remote UE can decide to establish a PC5 connection, for example as follows:

i. The remote UE generates a nonce, N_remote, and sends it to the relay UE. Optionally, it can include also the specific RSC it is interested in so that the relay UE is aware of it.

ii. The relay UE sends:

1. its public key (PuK_relay) and configuration parameters, e.g. RSCs,
2. the CN signature on the configuration parameters (e.g. RSCs) and public key as received from the CN, i.e., S(PrK_CN, RSCs | PuK_relay),
3. the received remote N_remote (optionally sent but required in signature computation),
4. a relay nonce, N_relay.

Some or all of these items can be signed with the relay's private key (PrK_relay).

In FIG. 3, S(PrK,M) means the signature of message M using private key PrK.

In this description, "|" corresponds to the concatenation operation.

iii. The remote UE can then (i) verify the CN signature and (ii) verify the relay signature including the (iii) the remote nonce. Thus, the remote UE can check that the relay UE has been authenticated first by the Core Network, without having to contact the CN during operation. This thus reduces the load on the Core Network that would otherwise need to make authentication operations for each Device to Device connection.

iv. If step iii) is successful, the remote UE can then send:
   1. its communication parameters, in particular, its PDU session parameters linked to the RSC and public key PuK_remote,
   2. corresponding CN signature for the corresponding communication parameters and public key,
   3. the nonce received from the relay UE, i.e., N_relay (optionally).
   4. All the above information elements (communication parameters, corresponding CN signature, nonce N_relay (optionally)) can be signed with the secondary station private key (PrK_remote), whose public key was signed by the CN.

The whole message can then be encrypted with the public key of the relay node PuK_relay, so that these parameters and information are not sent in the clear over the air. As can be seen in FIG. 3, E(PuK, M) represents the encryption of message M using public key PuK.

v. The Relay UE decrypts the received information and checks the CN signature of the remote and the signature of the remote UE. If the verification is correct and N_relay is present, the relay UE will serve the needs of the remote UE for the disclosed PDU parameters.

Thus, as explained earlier, during the connection to the Relay UE, neither the Relay UE nor the Remote UE need to communicate with the Core Network for authentication/authorization purposes. All the verification being implemented beforehand, this leads to a smooth and secure connection protocol without assistance from the CN during operation. Thus, even out of coverage UE may be able to securely connect to the PDU session.

As explained earlier, Discovery Model B requires the Remote UE to broadcast in order to connect to a Relay UE. Thus, when implementing a variation of the first embodiment to the specific case of Discovery Model B, at step c, the remote UE would broadcast its configuration parameters such as its RSCs. In the subsequent steps of this alternative, the Relay UE matches the received configuration parameter, e.g. the received RSC with its own ones. If there is a match, then the Relay UE can send its signed RSC, a relay nonce, CN signature related to that relay service code, and/or its public key similar to the subsequent steps in the first embodiment (Model A).

In a variant of the first embodiment, it is possible that the relay UE cannot be traced. To this end, the remote UE might generate an ephemeral public key pair and send it to the relay UE in step e.i. Since this public key pair is ephemeral, it cannot be used to trace the remote UE. The relay UE uses it in step e.ii to encrypt the message so that the relay parameters remain confidential from external (passive) attackers. Thus, the step of establishing a direct communication can include the secondary station generating its own encryption public key and private key. Together with the secondary station nonce, the remote UE can send a direct communication request to the relay station. This first message like in the first embodiment can optionally be secure.

In response to the direct communication request, the relay station sends a response message including a relay public encryption key and/or a first Core Network signature and/or and a response message signature where this message is protected (confidentiality) using the public key received with the direct communication request.

Then, the secondary station can decrypt the received message and check the first Core Network signature included in the response message and the response message signature.

It is to be noted that the above protocol can exchange RSCs in Step c since the discovery messages are small. Another variant of the first embodiment reducing the number of round trips consists in the relay UE broadcasting at that point of time (Step c) its configuration parameters (or part of them), policy, public key, and signature. If this is done, in Step d, the remote UE can already check whether the relay UE policy supports its PDU communication requirements. If it does, it checks the policy and public key validity by verifying the signature. In a subsequent step e according to this variant, the remote UE can decide to establish a PC5 connection as in Solution #28 with the addition that the UE shares its signed PDU session requirements encrypted with the public key of the relay UE. Finally, in step f, the relay UE can decrypt the remote's UE data, and verify its signature. If the verification is correct and the parameters are allowed by its policy, the relay UE will serve the needs of the remote UE.

Here, and anywhere in this document, verifying the signature may include checking the signature itself and also other fields such as an expiration date, issuer, and so on. Note that this might also include retrieving or accessing a revocation list where revoked public keys are included.

Further to this previous variant, the following can be done to (further) mitigate replay attacks: in step 1 c, the relay UE can use its private key to sign at time stamp, such as the current UTC time and optionally the rest of broadcasted information. This signature can also be included step 1 c. In step 1 d, the remote UE verifies the received signature on the UTC time and checks whether this time is recent. This thus avoids the risk of an attacker storing and replaying past messages.

Further to this previous variant, the following can be done to (further) mitigate MitM attacks. The relay UE can use its private key to sign its current location, e.g., GPS coordinates, building name, etc. This information can be included in step 1c. In step 1d, the remote UE verifies the received signature and checks whether the location matches its own one. This avoids the risk of an attacker having compromised a relay device at a specific location and reusing its broadcast messages at multiple locations. This feature can be used independently and standalone.

Since the broadcast of static RSCs can be considered as a privacy risk, another variant of the first embodiment consists in the sending party generating a nonce N and deriving a pseudo-RSC as pRSC=HASH(RSC | N) where HASH is a hash function takes as input the concatenation of RSC and N. The sending party then broadcasts (pRSC, N) (Step c). The receiving party has to apply the hash function to each of the RSCs it has and check whether there is a match. For this approach to be secure and work without collisions, pRSC, RSC, and N should be long enough. If the values can only be small in the discovery message (Step c), the following messages might include another pair (pRSC', N') using longer parameters.

In the first embodiment and all the variants discussed previously, if step e.iii fails, the remote UE will abort the connection. The remote UE can then inform the CN about the failed verification, and the relay UE parameters, the next time it is connected. Similarly, if step e.v fails, the relay UE refuses the delivery of the service. The relay UE can inform the CN about the failed verification, and the remote UE parameters. Thus, in case of a security risk being discovered, the Core Network is rapidly informed and =can check the concerned stations.

In a further variant of the first embodiment, the Remote UEs may receive the public keys (or the fingerprints) of the allowed relay UEs already in Step 1.b instead of in step e.ii.1, for example from the Core Network.

As explained in the first embodiment, in Step 1.d, the remote UE checks whether the relay UE supports its PDU requirements by checking whether an RSC matches. This is a one-to-one relationship and resembles a "role-based access control" approach employing pre-defined roles to carry out specific actions. In other words, if relay UE has RSC=x, then relay UE is authorized.

This signed RSC can be seen as an "authorization token". It can then be considered the proposed operation in which the RSC (the "authorization token" without signature) is distributed in step 1.c to perform a first check that fits the bandwidth needs of the discovery message. The complete "Authorization token" can be distributed in step e.ii, if a match is detected in the previous step. This simple operation—standalone—could be integrated in, e.g. Solution 31 in TR 33.847.

We note that more complex "policies" can be defined in the context of "Attribute-based access control". Instead of having only RSCs, we can consider more attributes related to the type of device the relay UE is (e.g., is it a private device? Is it public device?), the actions to be performed (e.g., upload of data? Download of data?), the data being accessed (e.g., confidentiality level?), the identifiers of applications, devices, or groups, or the current context (e.g., normal or emergency situation). The receiving party (e.g., remote) can have a policy, e.g., an XACML access control policy that can be used to check whether the sending party (e.g., relay) is authorized or not. This policy can be distributed during provisioning together with other configuration parameters that include any device attributes such as RSCs.

If the solution requires other sets of information or configuration parameters (that can be considered as roles or attributes) during discovery, e.g., as Solution #11 or Solution #8 in TR 23.752, this information can also be signed and distributed by the CN during the initial provisioning. The CN can also distribute during provisioning policies stating which requirements the other party should fulfil to be allowed to act as a relay, remote or peer. The information sent in step e.ii and e.iv might include all or part of the information sent during discovery, including the corresponding CN signature so that upon reception the data can be verified and cross-checked against the policy also received during provisioning.

In Steps 1.a and 1.b the CN generates a key pair for both remote UE and relay UE. Alternatively, the key pair can be generated by the UEs and the public key can be sent to the CN to be signed. The advantage of doing this so is that the CN does not have knowledge of the private key.

In Steps 1.a and 1.b, the CN signs a set of information for both remote UE and relay UE. The CN could also sign multiple sets of information so that the UEs can rotate them, i.e., change regularly, due to privacy reasons.

In Steps 1.a and 1.b, the CN signs public keys for both remote UE and relay UE. These public keys are associated to the corresponding private keys. In a further variant, the key pairs can be sometimes used for public key encryption and sometimes for digital signatures. In general, it is feasible to reuse (in a secure way) the same key pair for both signing and encryption. However, this is not a recommended practice since information leaked, e.g., when encryption might be used to break signatures. Thus, Steps 1.a and 1.b might also include the delivery of multiple, e.g., 2, signed public keys so that each of them can be used for a different purpose, e.g., encryption and signing.

If a remote UE has multiple RSCs for multiple PDU parameters, an option is that the CN signs all that information together. The problem of this approach is that when the remote UE sends this information to the relay UE for verification (message e.iv in FIG. 3), the remote UE has to send ALL RSCs and PDU parameters, since otherwise the relay UE cannot verify the message. This is again a privacy risk. The solution to this can be to build a Merkle tree with 2n leaves with n the number of RSCs a (remote) UE has. In this Merkle tree, leaves 2k and 2k+1 with k=0, . . . , n−1 take as input the k^th RSC and the corresponding PDU parameters respectively. The CN signs the root of the Merkle tree. When a remote UE has to disclose the PDU parameters for its k^th RSC, the remote UE only discloses leaves 2k and 2k+1, the corresponding intermediate nodes in the Merkle tree that allow computing the root of the Merkle tree, and the CN signature on the Merkle tree root.

The same applies to the RSCs in the relay. In this case, the RSCs might correspond to the leaves of a Merkle tree. When the relay discloses a specific RSC in message e.ii in FIG. 3, it has to disclose the RSC, the path in the Merkle tree to recompute the root, and the signature provided by the CN on the root of the Merkle tree.

Given above information, the receiving party has to use the path of the Merkle tree, RSCs (and PDU parameters) to check that the information allows recomputing the root of the Merkle tree, and then check the signature.

In all the variants, a suitable signature algorithm can be an Elliptic Curve (EC) Digital Signing Algorithm (DSA).

The information provided in the initial provisioning steps might include a different signature for each piece of information, e.g., for each RSC, for each public-key, for each PDU parameter. The advantage of this is that different pieces of information can be disclosed independently of each other.

In above description, public key encryption has been used. This can be replaced by identity-based encryption (IBE). In IBE, the identity of a UE corresponds to its public key. Given the identity of a UE, the CN uses a master secret to derive the corresponding private key for that UE. An advantage of IBE is that public keys do not need to be exchanged. Another advantage is that the public key serves as the "certificate" itself and only "authorized" parties will receive or be able to decrypt the privacy sensitive content. For instance, assume a relay with identity "RSC=x, expiration_date=2022/02/22". This is the information that a relay can broadcast and a remote UE can receive. If RSC=x and expiration_date are fine for the remote UE according to a policy that the remote UE has received from the CN during provisioning, the remote UE can use this identity "RSC=x, expiration_date=2022/02/22" of the relay UE as its public key. This means that the remote UE will use this public key to encrypt any privacy sensitive parameters such as PDU parameters and send this encrypted information. Only the relay having the corresponding private key—issued by the core network—will be able to decrypt the information.

In the above description, a UE owns a private key that can be used to prove its identity. However, a digital signature might be too bulky for some implementations, and its verification might require a considerable computational time. This is especially relevant for the discovery messages whose size might be limited in size, e.g., limited to a few hundreds of bits. An alternative solution to this consists in the CN configuring an announcing UE (e.g., a relay device) and monitoring UEs (e.g., a remote UE) with the seed and anchor of a hash chain so that the hash chain links can be used to prove that some broadcasted messages are coming from the announcing UE. Such a solution is relevant, e.g., for the discovery message sent by the announcing UE. This discovery message corresponds to message c. in FIG. 3. The security needs when protecting these discovery messages are outlined in Key Issue #1 in TR 33.847.

This solution focuses on Key Issue #1 (Discovery message protection). This solution proposes to reuse the open discovery security mechanism specified in TS 33.303 for 5G ProSe open discovery, as Solution #3 in TR 33.847 does, but enhanced to:

- Improve the resilience against message modification and replay attacks
- Ensure source authenticity
- Remove the need of the core network having to verify the integrity of the announcing messages.

The proposed enhancements are motivated by the fact that in TS 33.303 the integrity protection of the discovery messages over the PC5 interface requires a Discovery User Integrity Key (DUIK). This key is used to compute a Message Integrity Code (MIC). The MIC can be verified at the receiving UE, if the UE has been supplied with the DUIK or at the ProSe Function using the DUIK. In the first case, if the DUIK is supplied to a monitoring UE, the monitoring UE can verify the MIC itself. However, if multiple monitoring UEs receive the same DUIK, it is not feasible to guarantee integrity protection, replay protection or source authenticity, since any of those UEs might be malicious. If the ProSe Function has to check the MIC, this increases the load on the CN and the overall communication latency.

The basic idea of this solution is to complement the usage of the DUIK with a Discovery User Integrity Hash Chain (DUIHC) for source authentication. In the following, $H^j$(input) denotes $TRUNC_b$(Hash(Identifier|j|$H^{j-1}$(input)))

$H^1$(input)=$TRUNC_b$(Hash(identifier|1|input)).

Where,

"|" denotes concatenation,

Hash(input) refers to the computation of hash function on a given input,

"Identifiers" include fixed provisioned Policy/Parameter related to the identity of the announcing UE such as its L2 identifier, the PLMN in which the UE is announcing, the radio parameters when the UE is "not served by NG-RAN", etc.

$TRUNC_b$(A) is a function that returns b bits of input A, e.g., the b least significant bits of A.

Including either "j" and/or "Identifiers" in the computation of $H^j$(input) is optional but makes the solution more resilient against pre-computation attacks. The usage of $TRUNC_b$(A) aims at being able to reduce the communication overhead.

With this, a DUIHC is obtained from a randomly generated seed S as:

$$S \rightarrow H^1(S) \rightarrow H^2(S)+H^3(S) \rightarrow \ldots \rightarrow H^{N-2}(S)+H^{N-1}(S)+H^N(S)$$

Here, the arrow "4" indicates the direction when generating the links $H^1$(S), $H^2$(S), . . . of the hash chain. The last element, $H^N$(S), is the anchor of this DUIHC.

An announcing UE such as a Relay UE is given the seed S of its DUIHC. All monitoring UEs are given the anchor of the DUIHC of the announcing UE. These steps can be done during the authorization and initial provisioning of the devices corresponding to Step a and Step b in FIG. 3. When the UEs are given these parameters, the UEs are also given a reference time t0—the time when the announcing UE is supposed to use the hash chain link—and a timeslot duration tDelta.

When an announcing UE wants to send an announcing message m at UTC time t, the announcing UE may first compute the current timeslot j as (t−t0)/tDelta implying that the announcing UE has to use DUIHC link $H^{N-j}$(S). Note that this requires that N−j>0. The announcing UE uses $H^{N-j}$(S) together with the DUIK to compute the final key used in the creation of the MIC of the message m. This key is denoted as Discovery User Integrity Key and Hash Chain Link (DUIKHCHL) and is computed as:

$$\text{DUIKHCL}=\text{Hash}(\text{DUIK}|H^{N-j}(S))$$

The reason for including the DUIK in the derivation of the DUIKHCL is to provide interoperability with the existing TS 33.303 solution. This also ensures that this solution is as secure as the existing one. We note that an alternative is to use only $H^{N-j}$(S), or a key dependent on it in the computation of the MIC.

The MIC of message m is denoted $MIC_m$ and computed as:

$$\text{MIC}m=\text{MIC}(m,\text{DUKHCL})$$

The announcing UE may also include the previous DUIHC link, namely HN−j+1 (S), in the broadcasted announcing message:

$$m,H^{N-j+1}(S),MIC_m$$

When a monitoring UE receives the above announcing message at time t, the monitoring UE first computes the timeslot j by taking as input the reference time t0 and the timeslot duration tDelta. Then, the monitoring device caches the received message till the next time slot j+1 to receive $H^{N-j}$(S) in the following announcing message. With $H^{N-j}$(S), the monitoring UE can check:

a) the validity of the MIC received in the previous message, and thus, the integrity of the message itself. This is done by recomputing DUIKHCL and checking that the received $MIC_m$ matches the computed MIC.

b) the freshness and source authenticity of the message by checking that the received value of $H^{N-j}$(S)) is correct. To this end, the monitoring UE uses as input the received anchor.

Figure 6:
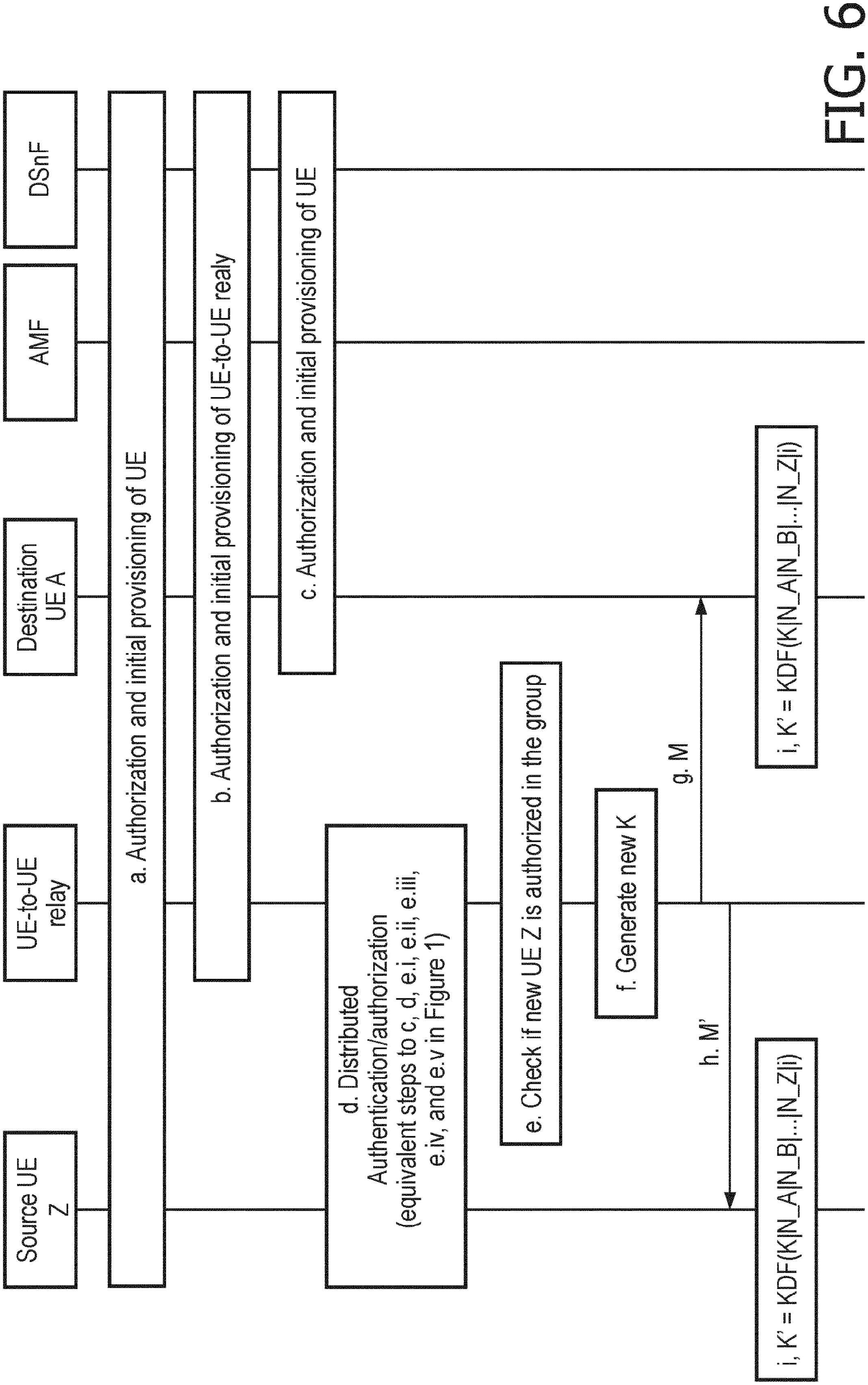
FIG. 6 is a time diagram of the communication in accordance with a protocol of the first embodiment of the invention.

The resulting message flows are similar to Solution #3 in TR 33.847 and the open discovery security mechanism specified in TS 33.303. Referring to FIG. 6.3.2-1, the following key differences arise from the usage of a DUIHC next to DUIK.

- Step 4 (Discovery Response) also includes the seed S of the DUIHC, the reference time t0, and timeslot duration.
- Step 5 (Start Announcing) is modified to use links in the DUIHC when computing the broadcasted MIC as described above.
- Step 9 (Discovery Response) includes the anchor of the DUIHC, the reference time t0, and timeslot duration.
- Step 10 (Receive announced code) is modified to use the received anchor of the DUIHC in Step 9 to verify the integrity, freshness and source authenticity of the received broadcasted message as described above.
- Step 11-15 are not required.

Additionally:

- If a monitoring UE detects a discovery message with a wrong MIC or DUIHC link, the monitoring UE can inform the HPLMN or M-UE DDNMF about the event.

If an announcing UE is revoked, then the HPLMN oor M-U DDNMF should inform the monitoring UEs that had expressed interest in being able to discover that announcing UE.

The DUIHC anchor that a monitoring UE receives in Step 9 corresponds to the latest link or a recently disclosed link of the announcing UE DUIHC.

The basic idea described above can be similarly applied to restricted discovery Mode A.

The basic idea described above can also be applied to restricted discovery Mode B. This might require that both the Discoveree UE and Discoverer UE can be the owner of a DUIHC to prove their identities based on a policy. Owning a DUIHC is especially relevant for the Discoveree UE if multiple Discoverer UEs can discover the same Discoveree UE and the verification of the response (Response Code) from the Discoverer UE is done locally by the Discoveree UEs.

An alternative method—which can be used with or without the DUICH approach described above—to improve the security guarantees in the discovery message is as follows. In mode B, see TS 33.303, the Discoverer UE is required to send a Query Code to the Discoveree UE. The Discoveree UE has to check its integrity/freshness/source authenticity, and if this verification succeeds, the Discoveree UE replies to the Discoverer UE with a Response Code. The Discoverer UE has to be able to check the integrity/freshness/source authenticity of this message. In TS 33.303, the verification by the Discoveree UE based on the DUIK can only happen locally; however, the DUIK-based verification by the Discoverer UE can happen locally or remotely in the core network based on a match report. This can lead to a situation in which, e.g., if multiple Discoverer UEs can discover the same Discoveree UE, then one of the Discoverer UEs might misbehave and impersonate a Discoveree UE. This situation can be improved by having two DUIKs, a DUIKre from Discoverer UE to Discoveree UE, and a DUIKer from Discovee UE to Discoverer UE. This guarantees that if multiple Discoverer UEs can discover the same Discoveree UE, none of the Discoverer UEs can impersonate the Response Code generated by the Discoveree UE if the MIC of the Response Code is verified by means of a match report. Further details and clarifications on this second point are as follows:

Key Issue #1 in TR 33.847 indicates that restricted discovery has integrity protection, freshness, and source authenticity as potential security requirements. Key Issue #1 also indicates as a potential threat that an attacker might impersonate the discoveree or the discovered UE.

Solution #4 reuses the LTE solution in TS 33.303. In Mode B, a Discovery User Integrity Key (DUIK) is used for the protection of Query Code and Response Code. The Discoverer UE sends the Query Code to the Discoveree UE. The Discoveree UE replies with the Response Code to the Discoverer UE. The Discoveree UE cannot make use of match reports to verify the MIC of the received Query Code. The Discoverer UE can make use of match reports to verify the MIC of the received Response Code.

The solution states that the Code-Sending Security Parameters of the Discoverer UE are linked to the Code-Receiving Security Parameters of the Discoveree UE. We denote this set of Security Parameters the Query Code Security parameters.

The solution states that the Code-Sending Security Parameters of the Discoveree UE are linked to the Code-Receiving Security Parameters of the Discoverer UE. We denote this set of Security Parameters the Response Code Security parameters.

A potential security issue might arise since the solution does not state anywhere that the security keys in the Query Code Security parameters have to be different of the security keys in the Response Code Security parameters. Actually, Steps 4 and 11 in FIG. 6.4.2.2-1 indicate that these two sets of Security parameters are identical.

If this is not stated explicitly as a requirement, simple errors might happen. For instance, assume that the very same DUIK is configured in the Query Code Security parameters and in the Response Code Security parameters. In this situation, the Discoverer UE can impersonate the Discoveree UE. This can be done even if the Discoverer UEs have to make use of match reports to verify the MIC of the received Response Code.

This issue can be addressed by requiring that the security keys, e.g., the DUIK, in the Code-Sending Security Parameters of the Discoverer UE must not be equal to the security keys in the Code-Sending Security Parameters of the Discoveree UE, in other words, two DUIKs, DUIKre (from Discoverer UE to Discoveree UE) and DUIKer (from Discovee UE to Discoverer UE)

A way of describing this properly in TR 33.847 and TS 33.303 is as follows:

Code-Sending Security Parameters of the Discoverer UE and Code-Receiving Security Parameters of the Discoveree UE should be called Query Code Security parameters.

Code-Sending Security Parameters of the Discoverer UE and Code-Receiving Security Parameters of the Discoveree UE should be called Response Code Security parameters.

It should be stated that Query Code Security parameters and Response Code Security parameters MUST be different.

Tdoc S3-212464, submitted to 3GPP SA3 #104e, describes keying procedures for group member and relay discovery. In particular, this Tdoc describes how the UE obtains the necessary security parameters to support group member and relay discovery, in coverage and out of coverage, e.g., for public safety scenarios. In Tdoc S3-212464 the following is described: "group member discovery is a type of restricted discovery and is expected to be supported in coverage and out of coverage. Group member discovery uses provisioned keys to support integrity, confidentiality and non-trackability of the discovery messages. A discovery root key from which other keys can be derived is used to secure over the air discovery and communications. This root key can be provisioned by the 5G DDNMF and/or by the 5G PKMF". Tdoc S3-212464 further proposes a solution based on TS 33.303 [2] as follows: "for both public safety discovery scenarios—group member discovery and relay discovery—the same solution is provided: a Public Safety Discovery Key (PSDK) is provisioned as the root key that is used for the protection of the Public Safety Discovery messages, and is associated with one or more Discovery Group IDs or respectively Relay Service Codes (RSCs). Both of these identifiers are defined in TS 23.303 [5]." The steps for group member discovery include: "Step 0: The UE connects to the network and obtains authorization from the PCF to perform Group Member discovery. The UE also gets the address of the 5GDDNMF of its HPLMN and/or of the 5G PKMF. Besides the security policy, the following additional parameters are sent to the UE: a set of one or more App-layer Group ID, (ProSe) Layer-2 Group ID, User Info, Discovery Group ID and their validity time(s). Step 1: The UE establishes a secure connection with the 5GDDNMF or the 5G PKMF of its HPLMN. The UE ID is authenticated and authorized by the 5GDDNMF or the 5G PKMF. Step 2: The UE sends a discovery key request to the 5GDDNMF or the 5G PKMF of its HPLMN. In the key request includes at least the following information: UE ID, set of one or more Discovery Group IDs and their validity times. Step 3: The 5GDDNMF or the 5G PKMF checks whether the UE is authorized for group member discovery. Step 4: If the check in step 3 is successful, then the 5GDDNMF or the 5G PKMF generates a Public Safety Discovery Key (PSDK) corresponding to the Discovery Group ID and its PLMN ID. More than one PSDK may be generated, but the overall validity time should match the validity times of the corresponding set of Discovery Group IDs of Step 2. Step 5: The 5GDDNMF or the 5G PKMF sends the key response to the UE. The key response message includes at least the following information: UE ID, PDSK identifier, PDSK, validity time. For Relay discovery, the procedures/steps for the relay discovery are identical to the ones for group discovery described above, with the following exceptions: (i) the UE is now the Remote UE or the UE-to-network Relay; (ii) Instead of parameter Discovery Group ID, the Relay Service Code is used; (iii) Instead of Layer-2 Group ID, the Destination Layer-2 ID is used; and (iv) App-layer Group ID is not used." The proposed solution Tdoc S3-212464 fails to identify the need of having different keys for the Query Code Security parameters and Response Code Security parameters used during the discovery phase as described in previous embodiments. If a single PSDK is provisioned as the root key that is used for the protection of the Public Safety Discovery messages—as proposed in Tdoc S3-212464—then even if a key derivation function is applied so that the Query Code Security parameters and Response Code Security parameters have different DUIKs, the involved devices will be able to generate all those keys, and thus, the Discoverer UE might be able to impersonate the Discoveree UE, as described above. To address this security issue, the keying procedures for discovery must distribute different master keys, i.e., different PSDKs, to be used for the derivation of Query Code Security parameters and Response Code Security parameters. For instance, the two different master keys might be PSDK_QCSP and PSDK_RCSP: PSDK_QCSP is used to generate the Query Code Security Parameters (including a DUIK and/or a DUSK and/or a DUCK) and PSDK_RCSP is used to generate the Response Code Security parameters (including a DUIK and/or a DUSK and/or a DUCK). In this way, the impersonation attack is not feasible. PSDK_QCSP and PSDK_RCSP might be generated independently and at random or they might be generated from a master key K by applying a key derivation function. In this last case, K must not be disclosed to the UEs, in particular, remote UE and relay UE since otherwise, the impersonation attack is feasible. The generation or retrieval of these keys can be done at Step 4 above when the corresponding network function in the core network, e.g., the DDNMF or PKMF, has authorized the UE and has identified its role, e.g., whether the UE is a remote UE or a relay UE or both. The distribution of these keys is done in Step 5 above.

In TR 33.847 v0.7.0 (August 2021), Solution #37 is included after SA3 #104e building on a revisited version of Tdoc S3-212464. Solution #37 indicates that the keying procedures for discovery must distribute different master keys. This updated protocol improves somewhat the protocol to avoid the above-described attack since a UE can now receive a number of PDSKs, e.g., two PDSKs, a PDSK for the Query Code Security Parameters and a PDSK for the Response Code Security Parameters. This improves the situation compared with TS 33.303, Section 6.6.7 where the protection of the discovery messages between the UEs is described including the fact that a (single) PDSK is distributed to a UE allowing to generate the discovery keys (DUSK, DUCK, DUIK) from the PDSK by means of Key Derivation Function (KDF). However, the description in TR 33.847 v0.7.0 (August 2021), Solution #37 is still not sufficient. The reason is that a Discoverer UE using match reports must not receive the DUIK used to verify the MIC or any other key that can be used to derive the DUIK. If the PDSK—used to derive the DUIK—is distributed to the UE since it allows generating the DUSK and DUCK, the problem is not solved because the UE has the PDSK, and thus, it can generate the DUIK. Thus, an improved keying procedure applicable to TR 33.847 v0.7.0 (August 2021) consists in distributing to a UE, in particular, to the Discoverer UE:

- a first PDSK that allows generating a first set of DUIK, DUSK, and DUCK to be used to secure the Query Code Security Parameters and
- A second DUCK and/or a second DUSK to be used to decrypt/unscramble the Response Code Security Parameters BUT without including a second DUIK. These second DUCK, DUSK, and DUIK keys can be generated, e.g., from a second PSDK by means of a KDF.

In TR 33.847 v0.7.0 (August 2021), conclusions are reached after SA3 #104e regarding key issue (KI) #1 and #2. In KI #1, for the restricted ProSe direct discovery scenario, Solution #4 is used as a basis for normative work including the note that "The security keys in the Code-Sending Security Parameters of discover UE and the security keys in the Code-Sending Security Parameters of discoveree UE need to be generated independently and randomly. This ensures that the impersonation of the discoveree UE is not feasible when the discoverer UEs make use of match reports." Stating that the keys are generated independently and randomly is aligned with above embodiments that require those keys to be different to avoid the impersonation attack. In KI #2, it is stated that: "The conclusion for direct discovery as follows: (1) The discovery keys include a cipher key, an integrity key and a scrambling key. (2) For open discovery, only integrity key will be assigned by the 5G DDNMF and will be used to provide integrity protection of the announce message. (3) For restricted discovery, 5G DDNMF will assign the discovery key(s) based on the requirement of the Prose Service." The conclusions in KI #2 are insufficient to defeat the impersonation attack mentioned above and not aligned with Solution #4 since the conclusions in KI #2 limit the number of DUIKs to a single one. Thus, conclusions for KI #2 are to be updated stating that: "(1) The discovery keys include at least a cipher key, at least an integrity key and at least a scrambling key."

Clause 6.3 in TS 33.503 describes the Security for 5G ProSe UE-to-Network Relay Communication. In Security for 5G ProSe Communication via 5G ProSe Layer-3 UE-to-Network Relay, control plane (Clause 6.3.3.3 in TS 33.503), it is stated that "PCF shall provision the authorization policy and parameters for 5G UE-to-Network Relay Discovery and Communication as specified in 5.1.4 in TS 23.304 [2]." In clause 5.1.4 in TS 23.304 it is stated: "Whether the security parameters can be provided by the PCF and details of security parameters will be determined by SA3 WG." In the first two steps 0a and 0b in the message flow in FIG.

6.3.3.3.2-1 in TS 33.503 it is stated that: "The Remote UE and relay UE shall be registered with the network. The UE-to-Network relay shall be authenticated and authorized by the network to support as a relay UE. Remote UE shall be authenticated and authorized by the network to act as a Remote UE." To this end, the remote UE and relay UE have to contact their respective AMFs. The AMFs serve as the entry point when registering in the network. As per 23.304 clause 4.3.4, the AMF selects "a PCF supporting 5G ProSe Policy/Parameter provisioning based on indication of 5G ProSe Capability as part of the "5GMM capability" in the Registration Request". Afterwards, it is stated that "the remote UE shall initiate discovery procedure using any of Model A or Model B method as specified in clause 6.3.1.2 or 6.3.1.3 of TS 23.304 [2] respectively." Later in the process (step 4 in FIG. 6.3.3.3.2-1 in TS 33.503), the AMF of the relay UE authorizes the relay UE to serve as relay (for the remote UE). Note that the AMF does so, as per 23.304 clause 4.3.4), by contacting the UDM to obtain from UDM the subscription information related to 5G ProSe and store them as part of the UE context data.

Two different entities cannot be in charge of managing the parameters and discovery keys that need to be distributed to both relay UE and remote UE for the discovery procedure to work. Thus, the current specification in TS 33.503 does not solve which entity manages the discovery parameters and keys and which entity authorizes the UEs to obtain the discovery parameters and keys. In particular, a single network function in a single network can be in charge of managing the discovery keys, this might be the PCF or PKMF or DDNMF or another NF in one of the networks.

In a first embodiment overcoming the above-mentioned problem, the remote UE (or relay UE) has registered with its network and seeks authorization for a given network relay service that is provided by a different network, e.g., the network of the relay UE (or remote UE). In this case, the network (e.g., through the AMF or PCF) of the remote UE (or relay UE) will inform the network of the relay UE (or remote UE), in particular, the PCF or a key management function responsible for the discovery keys (e.g., PKMF, DDNMF) of the relay UE (or remote UE), about (the identity of or the requested relay service by) the remote UE (or relay UE). When doing so, the network (e.g., PCF) of the relay UE (or remote UE) will provide the network (e.g., PCF) of the remote UE (or relay UE) with the corresponding discovery parameters and keys for the remote UE (or relay UE). Note that the remote UE's network and relay UE's network could work together to create discovery credentials or keys based on input (e.g. partial keys, UE identities, or network identities) from both networks. Once this is done, the remote UE (or relay UE) can be registered, authenticated and authorized by the network of the remote UE (or relay UE) as described in steps 0a and 0b in the message flow in FIG. 6.3.3.3.2-1 in TS 33.503. In particular, it will receive the discovery parameters and keys at this stage. Every time the network (e.g., PCF) of the remote UE (or relay UE) updates the discovery parameters and keys, the network (e.g., PCF) of the remote UE (or relay UE) has to contact the network (e.g., PCF) of the relay UE (or remote UE) that will then be in charge of updating the parameters to the relay UE (or remote UE).

In a second embodiment overcoming above problem, the remote UE (or relay UE) has registered with its home network and seeks authorization for a given network relay service that is provided by a different network, e.g., the network of the relay UE (or remote UE). In this case, the network (e.g., through the AMF or PCF) of the remote UE (or relay UE) will inform the network of the relay UE (or remote UE), in particular, the PCF of the relay UE (or remote UE), about the (identity of the) remote UE (or relay UE) and need of a relay service. Furthermore, the network (e.g., through the AMF or PCF) of the remote UE (or relay UE) will inform the remote UE (or relay UE) about the network of the relay UE (or remote UE), in particular, about the AMF or PCF of the relay UE (or remote UE) and/or a key management function in charge of discovery keys, that it has to contact for registration, authentication and authorization in steps 0a and 0b in the message flow in FIG. 6.3.3.3.2-1 in TS 33.503 and/or retrieval of discovery keys. This means that if this second embodiment is used, both remote UE and relay UE would retrieve the discovery parameters and keys from the same network, i.e., the network offering the service. In particular, both remote UE and relay UE would retrieve the discovery parameters and keys from that the corresponding, e.g., PCF.

In a third embodiment that can be combined with the above ones, the network of the relay UE and the network of the remote UE interact to match or align the relay service codes. For instance, in the first embodiment above, when the network of the remote UE (or relay UE) informs the network of the relay UE (or remote UE), about the requested (offered) relay service by the remote UE (or relay UE), the network of the relay UE (or remote UE) might match/align the relay service code of the other network with a relay service code used in its network.

Figure 7:
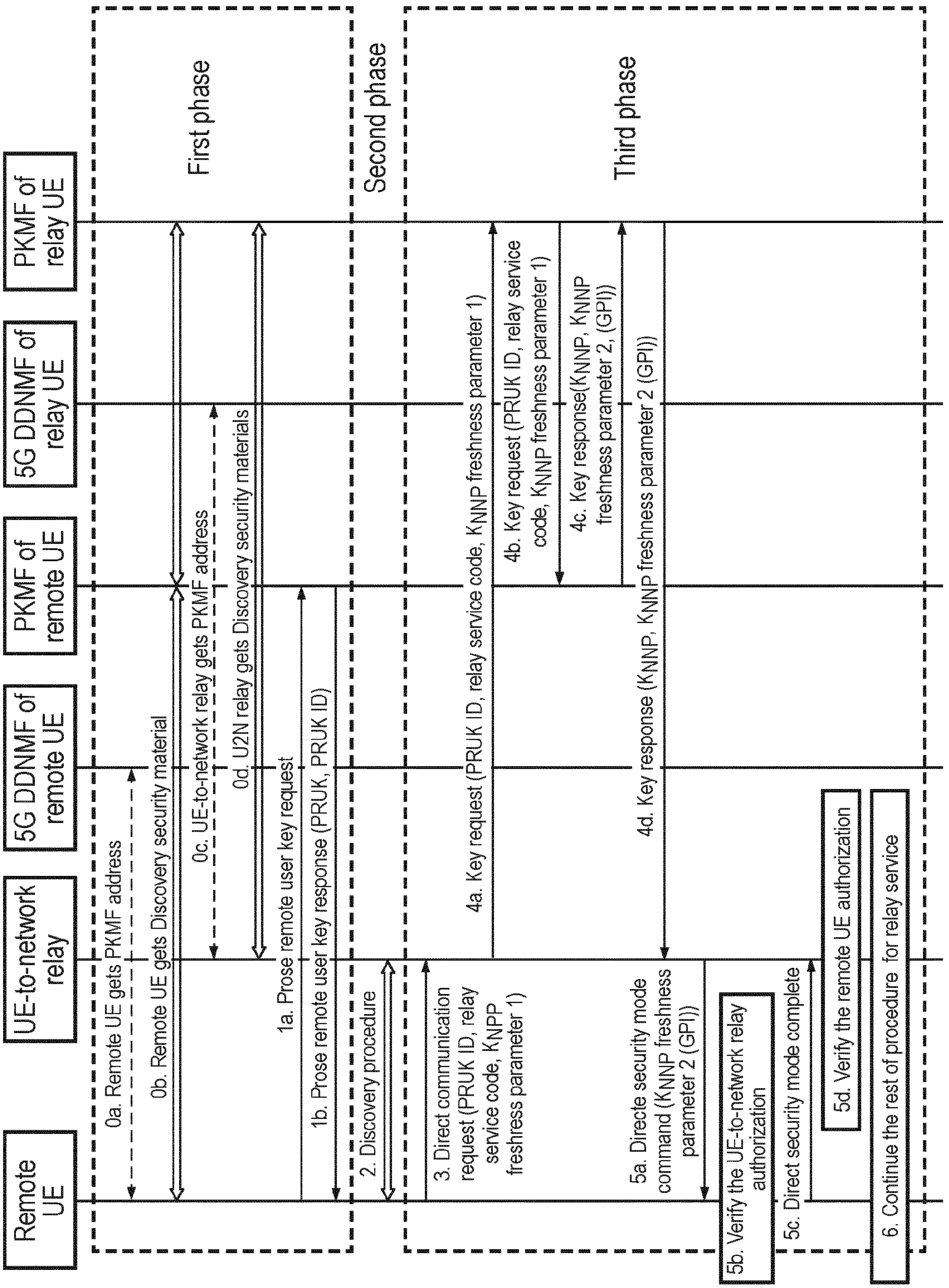
FIG. 7 is a time diagram relative to one improvement enabled thanks to an embodiment of the invention.
Figure 8:
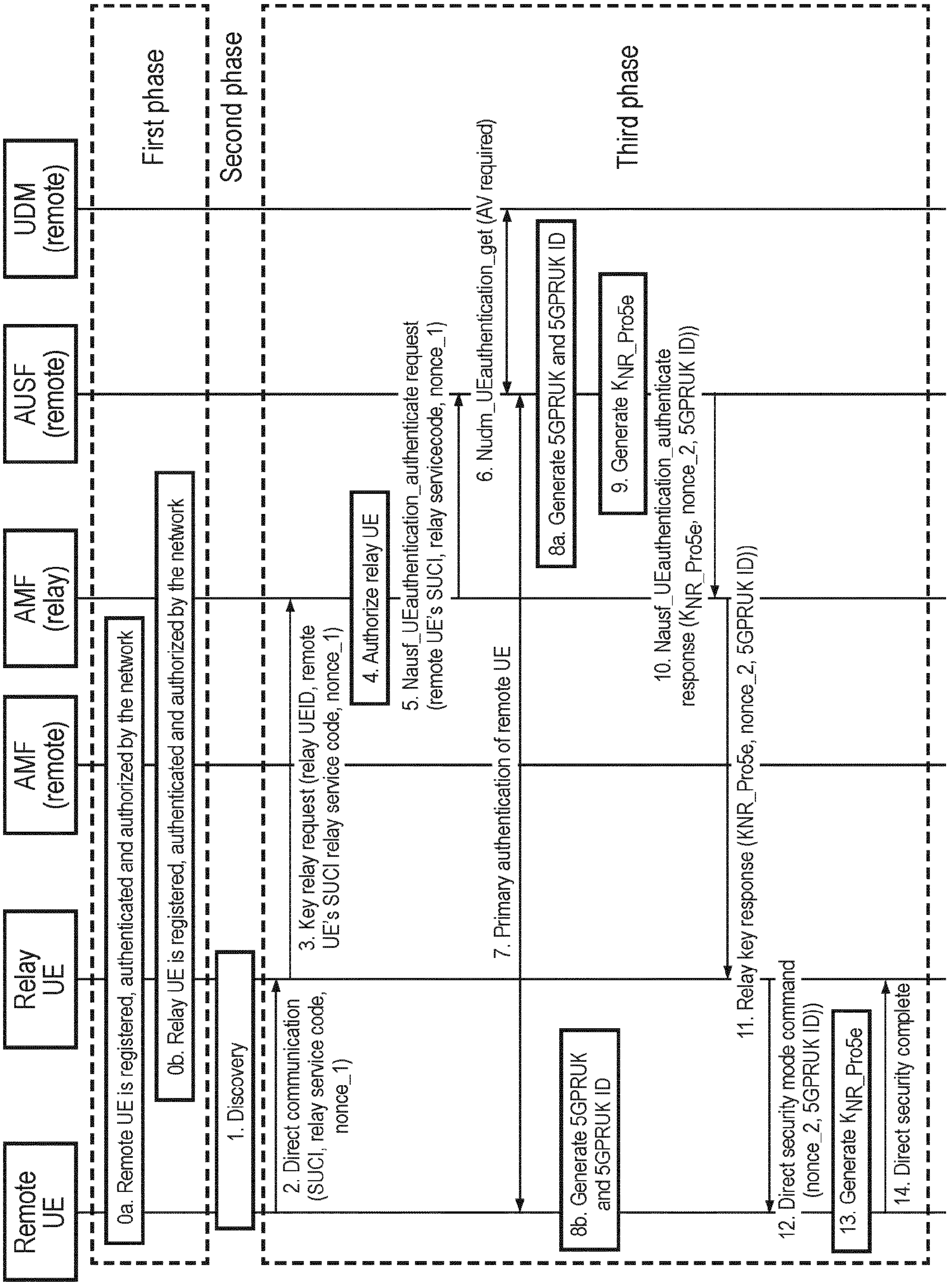
FIG. 8 is a time diagram relative to one improvement enabled thanks to an embodiment of the invention.

Clause 6.3 in TS 33.503 describes the Security for 5G ProSe UE-to-Network Relay Communication. In Security for 5G ProSe Communication via 5G ProSe Layer-3 UE-to-Network Relay, a user plane (UP) approach (Clause 6.3.3.2 in TS 33.503) and control plane (CP) (Clause 6.3.3.3 in TS 33.503) are described for 5G ProSe Layer-3 UE-to-Network Relay authorization and security establishment. FIG. 7 refers to FIG. 6.3.3.2.2-1 in TS 33.503 (Authorization and secure PC5 link establishment procedure for UE-to-network relay over the UP), FIG. 8 refers to FIG. 6.3.3.3.2-1 in TS 33.503 (Authorization and secure PC5 link establishment procedure for UE-to-network relay over the CP), In both UP-based and CP-based procedures there are three phases (as indicated in FIG. 7 and FIG. 8):

- a first phase involving the provisioning of discovery parameters including discovery keys,
- a second phase involving a discovery procedure that relies on the provisioned discovery parameters, and
- a third phase for PC5 authorization and security establishment.

While the second phase relies on the same discovery protocols, the first and the third phases might involve different protocols or entities (network functions). This can lead to an interoperability issue, e.g., if a UE is configured with discovery parameters/keys based on the UP first phase but then the third phase is CP-based for PC5 authorization and security establishment. The reason for this interoperability issue can be due to the lack of initialization of certain network functions. For instance, interoperability issues between the first phase of the UP-based approach (CP-based approach) and the third phase of the CP-based approach (UP-based approach).

Figure 9:
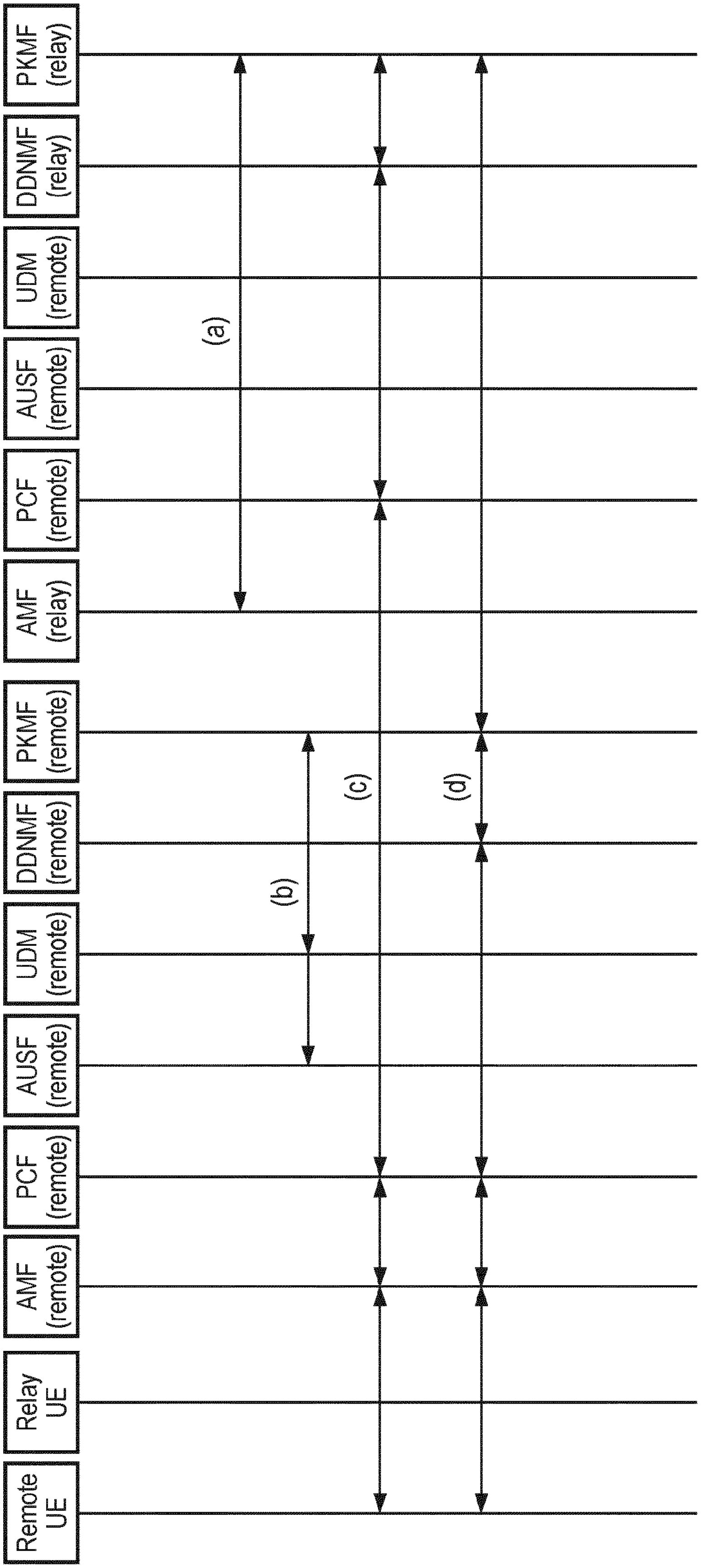
FIG. 9 is a time diagram of the communication in accordance with a protocol in another embodiment of the invention.

FIG. 9 shows a more complete description in which the entities involved in both the UP and CP procedures are included. FIG. 9 summarizes several interactions and communication that ensure interoperability between the first and third phases of UP/CP-based approaches:

In FIG. 9, in relation to reference a), the PKMF of the relay interacts with a network function in the relay network, e.g., AMF or UDM, by means of a communication interface so that if a UE is configured via the UP approach in a first phase, then if a UE starts a CP-based third phase, relay authorization (Step 4 in FIG. 8) can happen. This communication interface is denoted Npc10 as per Tdoc S2-2200214 (The reference point between the UDM and 5G PKMF. It is used to provide subscription information in order to authorise if a UE can act as a 5G ProSe Remote UE or a 5G ProSe UE-to-Network Relay). This communication might happen, e.g., after UE is configured via the UP approach (i.e., the PKMF pushes the configuration to the AMF) or on demand when the UE starts a CP-based third phase (i.e., the AMF sends a request to the PKMF).

In FIG. 9, in relation to reference b), the PKMF of the remote and the AUSF/UDM of the remote interact with each other by means of a communication interface to inform each other about the configuration of the remote so that they are ready for a CP-based third phase procedure and the network of the remote UE can authorize the remote. This communication might happen, e.g., after UE is configured via the UP approach (i.e., the PKMF pushes the configuration to the AUSF/UDM) or on demand when the UE starts a CP-based third phase (i.e., the AUSF/UDM sends a request to the PKMF), e.g., at Steps 4-10 in FIG. 8.

In FIG. 9, in relation with reference c), it is shown the interaction AMF-PCF (remote), PCF (remote)-PCF(relay), PCF-DDNMF, DDNMF-PKMF(relay) to retrieve keys managed by PKMF(relay) for the initial first phase (configuration of discovery parameters/keys) in the CP-based procedure. Here, a network function such as the PKMF (relay) manages the keys for both UP and CP.

In FIG. 9, in relation with reference d), it is shown the Interaction AMF-PCF, PCF-DDNMF, DDNMF-PKMF(remote) and finally PKMF(remote)-PKMF(Relay) to retrieve keys from PKMF(Relay) for the initial first phase (configuration of discovery parameters/keys) in the CP-based procedure. Here, a network function such as the PKMF (relay) manages the keys for both UP and CP.

In the following, different embodiments are described. Next to KI #16 in TR 33.847, the first embodiment and its variants above also addresses/can be applied to other key issues related to UE-to-network relay including, at least:

Key issue 4 (KI #4) is about Authorization in the UE-to-Network relay scenario, i.e., how to authorize a relay UE to act as relay. This can be done in Step 1.e.iii where the remote UE checks the RSC of the relay and if its signature is valid, it can verify that it was authorized by the CN to provide the corresponding service.

Key issue #3 (KI #3) Security of UE-to-Network Relay and Key issue 9 (KI #9) Key management in 5G Proximity Services for UE-to-Network relay communication are about how keys should be handled and the PC5 link protected.

Figure 4:
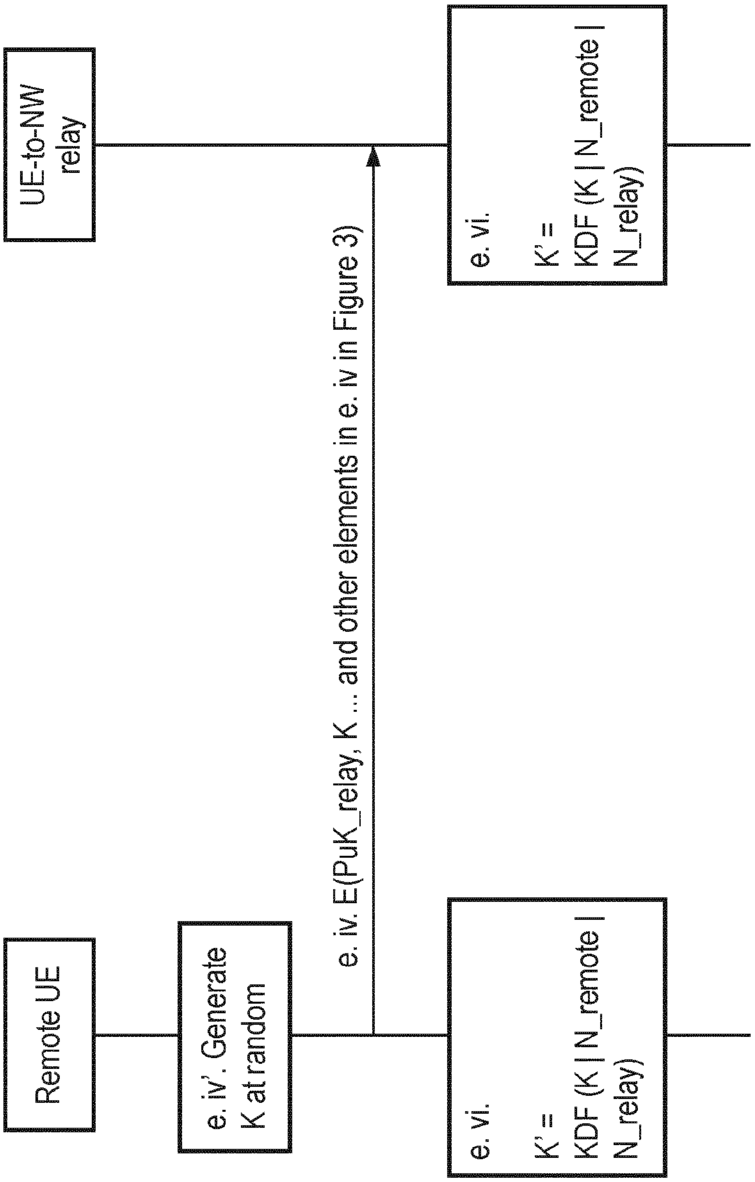
FIG. 4 is a time diagram of the communication in accordance with a protocol of a second embodiment of the invention.

The setup described in the first embodiment can be extended to address these key issues. It is possible to exchange a shared secret K' to secure the PC5 communication link between remote UE and relay UE. One option is that the remote UE generates a shared secret K at random before step e.iv. In step e.iv, it sends K to the relay UE in a secure way by encrypting it. The signature that is included in step e.iv can also have (the encrypted) K as input so that the relay can check the integrity of K. The shared secret K' is computed, e.g., by applying a KDF on the concatenation of K, N_remote, and N_relay in step e.vi. This is shown in FIG. 4. Another option emerges if Extension 1 is available. In this case, K can be generated by the relay UE and sent to the remote UE in step e.ii.

A suitable approach for key exchange is Elliptic Curve (EC) Diffie Hellman. A suitable approach for public key encryption is EC Integrated Encryption Scheme.

Note that the above paragraph describes a distributed alternative to solutions #1, #6, #10, and #15 in TR33.847 that address KI #9. In those solutions the core network is involved in the generation and distribution of a shared symmetric key between remote UE and relay UE. In particular, the remote UE sends a "Direct Communication Request" to the Relay UE that triggers a further request towards the CN to distribute/generate a shared secret that can be used to secure the PC5 between remote UE and relay UE.

Key Issue 11 (KI #11) is about UE identity protection during ProSe discovery, i.e., how the UE identity should be protected during the discovery. This can be done as in Step 1.e.i where the remote UEs only reply with a nonce upon the reception of the RSCs broadcasted by a relay. The nonce can have two purposes here. The first one is about freshness as already described in the main protocol. The second purpose is to act as a temporary identifier of the UE so that its true identity is not disclosed until the remote UE has verified that the relay UE is authorized to serve as relay. The true identity of the remote UE might be disclosed in Step 1.e.iv together with the PDU parameters.

The first embodiment and its variants above also addresses/can be applied to other key issues related to UE-to-UE relay. In UE-to-UE relay scenarios two remote UEs need to communicate to each other, directly, through a relay UE.

We note that in TR 23.752, solution #11 is chosen as baseline for model A discovery and solution #8 is chosen as baseline for model B discovery. In case of solution #11, the discovery information includes: (i) Type=Announcement, (ii) Discovery Type=UE-to-UE Relay Discovery, (iii) Announcer Info (i.e. an upper layer identifier for the UE-R user), (iv) ProSe UE ID of UE-R (i.e. Layer-2 identifier of UE-R), (v) a list of "Target User Info" parameters (or attributes) (including users of UE-1 and UE-2) that have been gathered during Group Member Discovery in step 2. "Target User Info" is an upper layer parameter identifying the target user. To support Layer-2 communication via the stateful UE-to-UE Relay, the "Target User Info" also includes the Layer-2 identifier of the target user's UE. In solution #8 the discovery information is done by sending a "broadcasted" direct communication request, so not a separate discovery message. This direct communication request can include source UE info, target UE info, Application ID, as well as Relay Service Code.

Key Issue 6 (KI #6) is about Integrity and confidentiality of information over the UE-to-UE Relay, i.e., how to protect the communication between two remote UEs that communicate over a relay UE. In particular, once two UEs have identified and connected to a suitable relay following the solution above, the two UEs can use the same information configured by the CN to exchange a symmetric key (as in Extension 2) that can be used to secure the communication between both UEs.

Related work and differences: It is to be noted that Solution #8 in TR 33.847 also uses public keys to address this same scenario. However, the current solution has a number of FFS that are addressed in this solution. Solution #16 also addresses KI #6, although it does not mention public key cryptography directly.

In the following, it is described how solution #8 can be improved by using public key cryptography. Some of these improvements can also be applied to Solution #16.

The first point still to be discussed is about how the public keys are bound to a specific UE. This means that this solution does not provide authentication means and it is prone to Man in the Middle attackers. This is solved in this solution since public keys assigned to the UEs are signed by the CN.

Solution #8 also describes the exchange of public keys in messages 2 and 4 and in step 6 it writes: "The extended link is secured end to end using source UE's and target UE's public key, while the routing information will be left in the clear." From this description, it seems that it focuses on a Diffie-Hellman key exchange where the secret key equals pr_A*PU_B=pr_B*PU_A, where pr means private key and PU means public key. This solution does not cover therefore ECIES or key encapsulation mechanisms (KEMs), e.g., being standardized by NIST Post Quantum Cryptography (PQC). Examples of PQC KEMs include SABER, Round5, Kyber, or NTRU. The difference in this regard is that in message 2 the source UE sends its public key and upon reception the target UE generates a random key K at random that is encapsulated using the source UE's public key. Message 4 includes an ephemeral public key component from the target UE and the encapsulated key.

Another FFS in Solution #8 is about how to make sure that a DCA message can be trusted. This can be done if the public keys are signed by the CN, as done in the present solution in Steps 1.a and 1.b. As mentioned above, an IBE solution can be used as well.

Solution #8 configures the relay in Step 0 with relay policy/parameters and then in Step 3, if the policy matches and the relay is allowed to relay the message, it does so. This approach has some issues such as.

First, message #2 (the Direct Communication Request from Source UE to UE-to-UE relay) can be replayed. This can be avoided if the message includes a nonce disclosed by the relay first and signed by the source UE. Alternatively, the source UE can also sign the current time and the relay will only accept messages within a given time window. This is equivalent to step 1.e.iv.

Second, the parameters in message #2 are in the clear and are not integrity protected. This means that they can be modified by an attacker. By observing whether a relay or a target UE react to message 2, and message 3, the attacker can also learn, e.g., which ProSe applications the relay or target UE support. This can be solved if the relay discloses first its public key (e.g., sends it to the source UE) and the source UE uses it to encrypt any privacy sensitive parameters. This is equivalent to step 1.e.ii.

Figure 5:
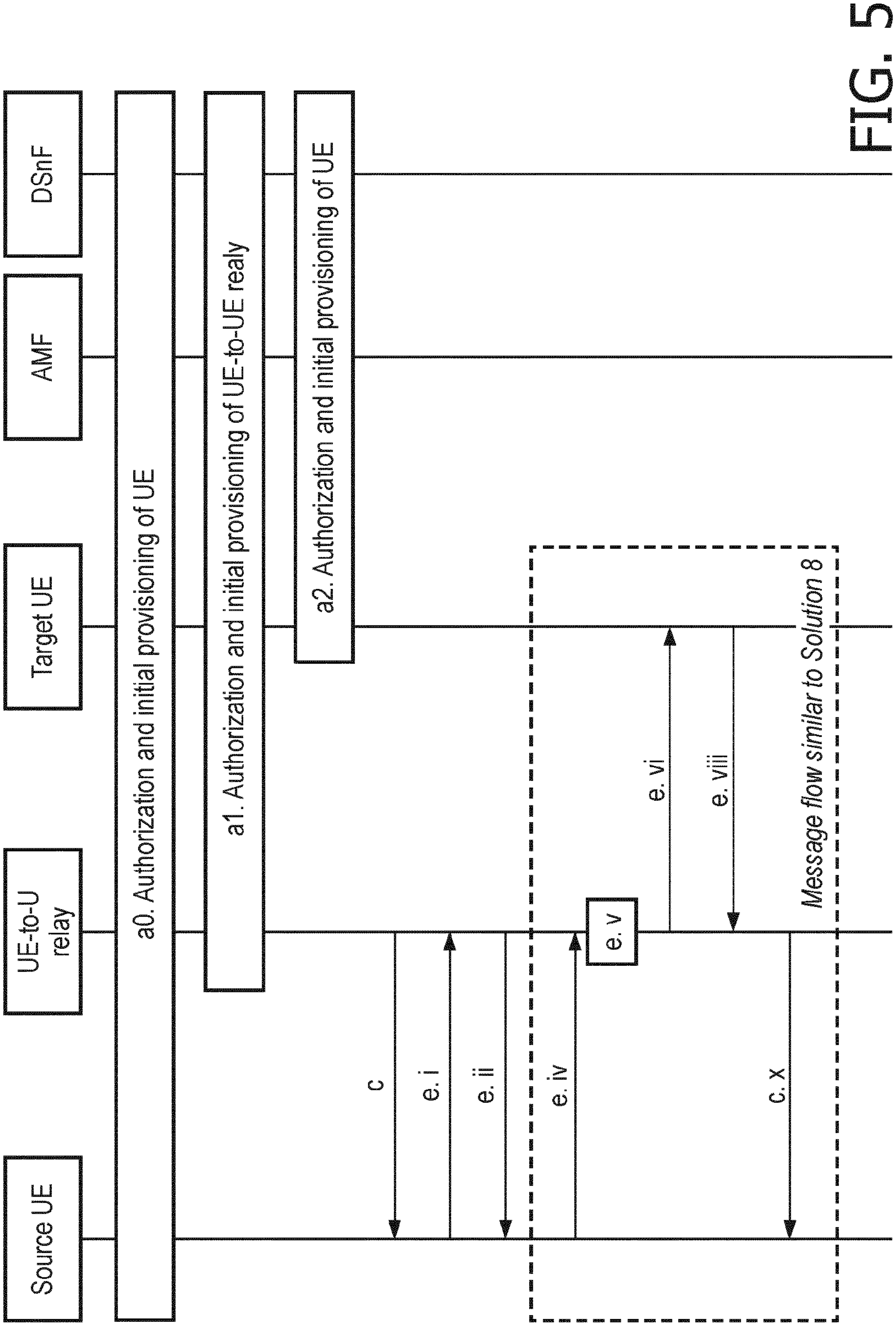
FIG. 5 is a time diagram of the communication in accordance with a protocol of a third embodiment of the invention.

FIG. 5 describes how Solution #8 can be improved based on the ideas above.

Steps a0, a1, a2 are about the initial provisioning of UEs and relays. This initial provisioning is similar to Steps a and b in the main solution with the addition/difference that the devices are provisioned with information/policies related to their capabilities to relay information in UE-to-UE use cases.

Step c is as in the first embodiment or its variants.

Step e.i is as in the first embodiment or its variants.

Step e.ii is as in the first embodiment or its variants with the addition/difference that now the relay station distributes signed information related to its capabilities to relay information in UE-to-UE use cases.

If this information is successfully verified by the Source UE, the source UE replies with e.iv, as in the main solution. Note that since the source UE has the public key of the relay, these parameters can be encrypted to ensure privacy. Note that since the public key of the source UE is signed by the CN, the source UE can sign any communication parameters to avoid MitM/replay attacks. Some of those ProSe parameters (e.g. broadcast Layer-2 ID, ProSe Application ID, UE's Application Layer ID, target UE's Application Layer ID, relay applicable indication) might have also been signed directly by the CN and provided to the source UE in Step a0.

In Step e.v the relay checks whether it is capable/allowed to forward the information in this connection. The relay also checks whether the source UE is as it claims to be. These checks are very similar to the first embodiment.

Step e.vi consists in forwarding the information to the target UE. However, it has to be taken into account that the information in e.iv was encrypted with the key of the relay and the target UE does not have the corresponding private key. The target UE can however decrypt and encrypt again the information based on the public key of the target UE. Alternatively, the relay can use a symmetric key shared between target UE and remote UE and established at an earlier stage, namely when the target UE went through steps c, e.i, e.ii, e.iv itself when connecting to the relay. It is to be noted that the relay might be aware already of the preferences/policies of the target UE (e.g., if those have been disclosed to the relay beforehand), and thus, the relay might only forward this message if the message fulfils the target UE's policy. This step might also include one or more nonces, e.g., the nonce in step e.i or in step e.ii or a combination of them.

Step e.vii is about the target UE checking the incoming message. It checks whether the source UE fulfils its policy/communication needs. The target UE can check this out, since it receives the communication information of the source UE signed by the CN and/or source UE. In a specific option in Step e.vii, the target UE can generate a symmetric key at random and use the received (quantum resistant) public key of the source UE to encapsulate/encrypt a randomly generated symmetric key K, the source UE will also generate its ephemeral public key to this end.

Step e.viii is used to confirm the communication and includes the public key of the target UE. It can also include further information from the target UE, e.g., signed by the CN so that the source UE can verify it. This information can be encrypted with the encapsulated key (Step e.vii) or with the public key of the source UE. This information might also be signed by the target UE. Alternatively, a message authentication code can also be obtained using a symmetric key previously established between relay and target UE. The purpose of the signature or MAC is to let the relay know that this is trustworthy message and it can forward it. This message can also include the nonces in Step e.vi so that relay and source UE can check the freshness of the message.

Step e.ix is about the relay checking the signature or MAC exchanged in Step e.viii.

Step e.x contains the message e.viii without signature or MAC. Upon reception of this message, the source UE can decapsulate the symmetric-key and decrypt any information related to the target UE. After decryption, the source UE can verify the information by checking signature and the freshness by checking the nonces.

Steps in FIG. 5 (described above) and Steps in FIG. 6.8.2.1-1 in TR 33.847 correspond to each other as follows

| FIG. 5 | FIG. 6.8.2.1-1 in TR 33.847 |
|---|---|
| Step e.iv | Message 2 |
| Step e.vi | Message 3 |
| Step e.vii | |
| Step e.viii | Message 4 |
| Step e.ix | |
| Step e.x | Message 5 |

Key issue #7 is about authorization in the UE-to-UE relay scenario, i.e., how the remote UEs can verify that they are authorized to talk to each other. In particular, once two UEs have identified and connected to a suitable relay following the solution above, then following is feasible:

In a very first configuration stage, the CN network in the initial provisioning phase should provide each UEs with a policy describing its communication attributes and also a policy determining which attributes are required by the UE to allow a device-to-device communication link with another UE. Each UE should also receive a public key signed by the CN. The UE should be in possession of the corresponding private key, or receive it from the CN as well.

During operation, two alternatives are considered:

Alternative 1: During operation, one of the UEs might send its communication policy to the other UE. The second UE will check it, and if it is authorized, send its own communication policy to the first device. If the first device also authorizes the second device, then it will send a confirmation to the second device.

Alternative 2: During operation, when a UE joins a group, the UE first receives the parameters from the relay signed by the CN. This equivalent to step e.ii in FIG. 3. The UE then checks whether the relay is authorized for UE-to-UE communication and supports its communication needs (RSC). This checks are similar to those in step e.iii in FIG. 3. Next, the UE sends its communication parameters to the relay UE, similar to e.iv in FIG. 3. The relay UE checks them (step e.v in FIG. 3).

The first embodiment and its variants above also addresses/can be applied to other key issues related to groupcast communication. In particular, this partially relates to KI #13 in TR 33.847 that is about security and privacy of groupcast communication and involves the protection of L2 IDs in terms of linkability, traceability and privacy and also about the integrity/confidentiality of the communication.

Next we present a solution to deal with these issues that builds on Alternative 2 presented above for key issue #7. After performing the steps described in Alternative 2, the relay can check if the UE can join (is authorized) the communication with other UEs that might already be part of a group of UEs. If the UEs are authorized to talk to each other, the relay informs each of the UEs in the group. In particular, assume that a new UE Z has joined. When the relay informs the remote UEs (A, B, . . . , Y) about a new UE Z joining the group, the relay sends N−1 messages M, a message M to each of the UEs (A, B, . . . , Y) that were already in the group. This message M is similar to e.iv in FIG. 3 where (i) PuK_relay is replaced with the public key of A, B, . . . (ii) N_relay is replaced with a nonce sent previously by A, B, . . . Y; (iii) S(PrK_CN, RSCIPDU-_param|PuK_remote) is the signature from the core network on the capabilities of the new device Z instead of the remote device, and (iv) S(PrK_remote, . . . ) is replaced by a signature from the relay device on the sent parameters. Furthermore, the relay also has to inform the new device Z about the existing devices (A, B, . . . , Y). To this end, the relay sends a message M' to Z. M' is as M but that instead of containing the information of a single device, it contains the information of N−1 devices.

In addition to the above, the relay can handle a master group key K that can be used for communications within the group. The relay generates this master group key K at random that can be distributed to the UEs protected in above messages M and M'. A new master group key can be generated every time a new device joins or leaves the group. A derived group key K' can be derived as the key derivation function using as inputs K and the nonces of all devices in the group. For instance, a hash function can be applied to the concatenation of K and each of the nonces sorted in increasing value and a counter i. This counter i can be used to rotate K' over time.

This key can also be used to derive a Destination L2-ID, e.g., by applying a key derivation function on K' and taking the least significant bits.

Note that this approach for checking the mutual authorization and distribution of a group key means that the relay has to send a total of N−1 messages. This is an improvement compared with a solution in which each UE has to authenticate/authorized to each other that would require an overhead of N^2 messages. Such a benefit is also mentioned in Solution 12, addressing KI #8: "UE1 may be communicating with more than one Target UE over the PC5 unicast link via the UE-to-UE Relay. In that case, all Target UEs must be informed of UE1's new IP address/prefix".

This solution is shown in FIG. 6 whose main steps are as follows:

Steps a, b, c are about the initial provisioning and equivalent to Steps a and b in FIG. 3.

Step d refers to the discovery and distributed authentication/authorization. This includes equivalent steps to c, d, e.i, e.ii, e.iii, e.iv, and e.v in FIG. 3.

Step e is about checking whether the new UE Z is authorized in the group according to the policies of other UEs.

Step f is about the generation of the master group key as defined above.

Step g is about sending message M to each UE that was already part of the group.

Step h is about sending message M' to the new UE.

Step i is about the generation of the current group key.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

Figure 10:
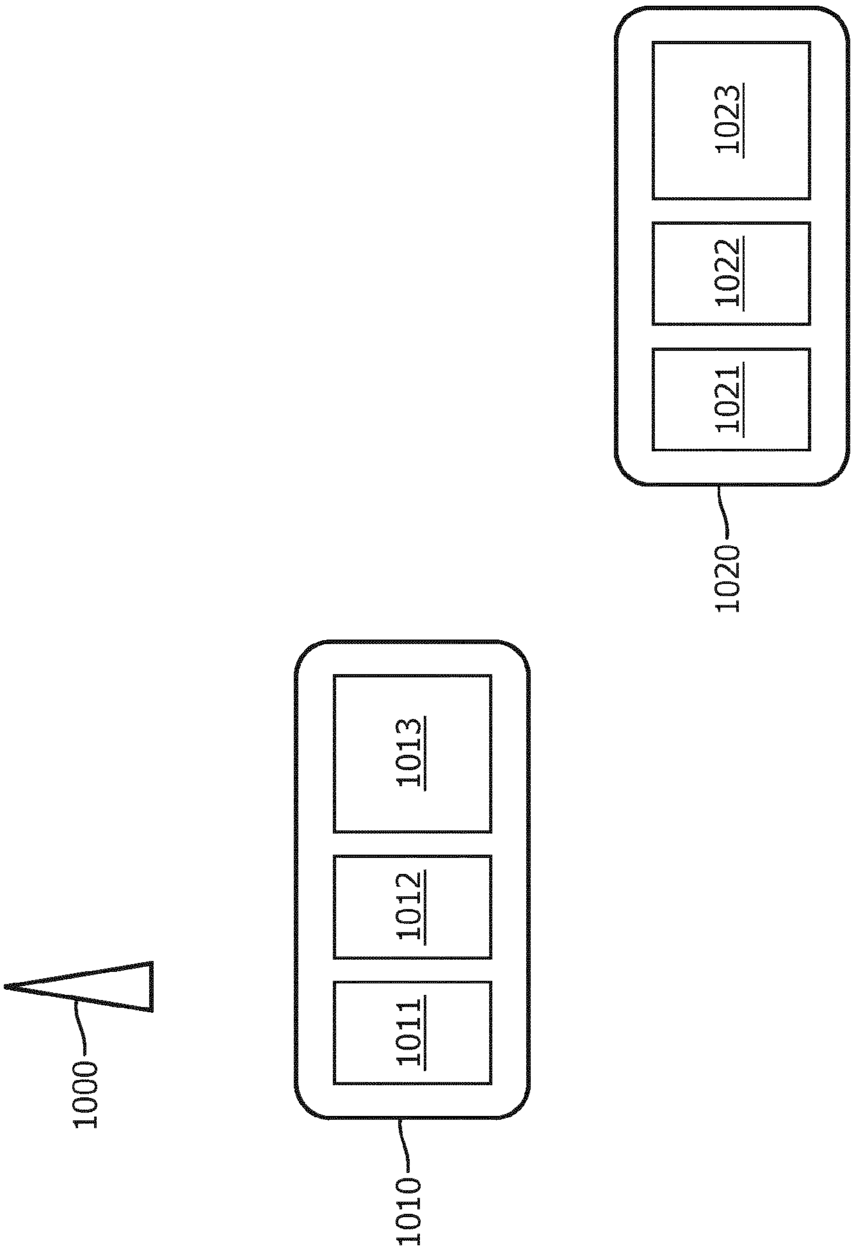
FIG. 10 is a block diagram representing a secondary station and a relay station in accordance with an embodiment of the invention.

As explained throughout the previous embodiments, the proposed variants of the invention can be implemented in a network, for example a cellular network as a 5G network, shown on FIG. 10. A cell of the network is served by a primary station 1000. Under the coverage of the primary station 1000 (e.g. a gNB), a plurality of secondary stations can connect to the primary station. Some secondary station may be adapted to operate as relay stations 1010. Such a relay station may comprise a transmitter 1011, coupled with an transmit antenna, a receiver 1012 coupled with a receive antenna. Typically, the receive and transmit antenna are the same antenna. Further, depending on the technology, the antenna may be formed by an antenna array which may allow different transmission/reception modes, such as MIMO, transmit diversity, and operation on different sets of frequencies.

A controller 1013, for example a CPU or microcontroller operating with a software is adapted to control the transmitter and the receiver and control the antennas. It is to be noted that some or all of the transmitter, the receiver and the controller may be part of a single baseband processor. In connection with the above described embodiments, the controller is adapted to establish a connection between the relay station 1010 and the primary station 1000. More specifically, the controller 1013 can configure the receiver 1012 for receiving in at least one first secure message from the primary station 1000 a first set of configuration parameters including attributes or service codes The controller 1013 can control the transmitter 1011 and cause it to transmit at least one transmitted attribute or service code from the first set of configuration parameters. This attribute or service code can be broadcast for reception by other stations, for example like secondary station 1020.

Further, the controller 1013 may be then configured for establishing a direct communication with the secondary station 1020 using the public key upon request from the secondary station, said request being based on the transmitted service message.

Typically, the relay station may be a UE, like a Sidelink compatible UE, which thus can behave as a relay station when configured to. Alternatively, the relay station may also be a another primary station, like an Access Point, or a gNB or a femtocell gNB.

The secondary station 1020 may typically be a UE, and comprises a transmitter 1021, a receiver 1022, both typically coupled to one or more antennas or antenna array. Further, the secondary station 1020 includes a controller 1023 which is adapted to control the receiver 1021, the transmitter 1022 and possibly other elements of the UEs. As for the relay station, the controller 1023 may be a processor or a CPU, and may operate thanks to a software.

The controller 1023 is able to cause the receiver 1021 and the transmitter 1022 to establish a connection with the primary station 1000. This includes for example configuring the receiver 1021 for receiving from the primary station 1000 in at least one second secure message a second set of configuration parameters including attributes or relay service codes linked to an upcoming data exchange with the relay station 1010.

The receiver 1021 may be adapted for receiving at least one transmitted attribute or service code from the relay station 1010 and the controller may be configured for determining whether the transmitted attribute or service code is included in the second set of configuration parameters or fulfil a policy in it and causing the transmitter to establish a direct communication with the relay station 1010 upon determination that the transmitted service code is included in the second set.

The described operations like those indicated in FIGS. 3 to 9 can be implemented as program code means of a computer program and/or as dedicated hardware of the related communication device or access device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method for operating a communication system including a primary station linked to a core network, said primary station serving a cell, a relay station served by the primary station and a secondary station served by the primary station, the method comprising the steps of:

establishing, by the relay station, a connection with the primary station, including receiving in at least one first secure message from the primary station a first set of configuration parameters including service codes, wherein the at least one first secure message further includes a relay public encryption key and at least one first core network signature from the core network, establishing, by the secondary station, a connection with the primary station, including receiving from the primary station in at least one second secure message a second set of configuration parameters, including relay service codes linked to an upcoming data session, transmitting, by the relay station, at least one transmitted service code from the first set of configuration parameters, establishing, by the secondary station, a direct communication with the relay station upon determination that the transmitted service code is included in the second set of configuration parameters, wherein establishing the direct communication includes:

the secondary station sending a direct communication request to the relay station, the relay station responding to the direct communication request by a response message including the relay public encryption key, the first core network signature, and a response message signature, and the secondary station checking the first core network signature included in the response message and the response message signature.

2. The method of claim 1, wherein the at least one first secure message further includes a corresponding relay private encryption key.

3. The method of claim 1, wherein the second secure message further includes a secondary station public encryption key, and the corresponding secondary station private encryption key.

4. The method of claim 2, wherein the at least one first core network signature from the core network is generated at least on:

the relay public encryption key, and on at least an attribute of the first set of configuration parameters or one of the service codes of the first set of configuration parameters, and the at least one second secure message includes at least one second core network signature from the core network generated at least on:

the secondary station public encryption key, and on at least an attribute of the second set of configuration parameters or one of the service codes of the second set of configuration parameters.

5. The method of claim 2, wherein the at least one first secure message includes at least one first core network signature from the core network generated at least on:

the relay public encryption key, and on at least an attribute of the first set of configuration parameters or one of the service codes of the first set of configuration parameters, and the at least one second secure message includes at least one second core network signature from the core network generated at least on:

parameters relative to the upcoming data session, said parameters being included in the second secure message, the secondary station public encryption key, and on at least an attribute of the second set of configuration parameters or one of the service codes of the second set of configuration parameters.

6. The method of claim 1, wherein the direct communication request includes a secondary station nonce, and wherein the response message signature is generated by applying the relay private encryption key on at least the secondary station nonce.

7. The method of claim 6, wherein the response message signature is generated by applying the relay private encryption key on at least the secondary station nonce, and at least one of the core network first signature, the relay public encryption key.

8. The method of claim 1, wherein the response message further includes a relay nonce, and wherein the secondary station transmits communication parameters in a configuration message, said configuration message including a configuration message signature, said configuration message signature being generated by applying the secondary station private encryption key on at least the relay nonce.

9. The method of claim 8, wherein said configuration message signature is generated by applying the secondary station private encryption key on at least the relay nonce, and at least one of the core network second signature, the secondary station public encryption key.

10. The method of claim 1, wherein the step of establishing a direct communication includes:

a. the secondary station generating or selecting a secondary station encryption public key, a secondary station encryption private key and a secondary station nonce, sending a direct communication request to the relay station, b. the relay station responding to the direct communication request by a response message including a relay public encryption key and/or a first core network signature and/or and a response message signature where this response message is encrypted using the public key received in step a, c. the secondary station decrypting the response message and checking the first core network signature included in the response message and the response message signature.

11. The method of claim 1, wherein the relay station transmitting at least one transmitted attribute of the first set of configuration parameters or a service code from the first set of configuration parameters and at least one of the following further information: a data session policy, a data session parameter, the first core network signature, a relay public encryption key, and wherein the secondary station establishing a direct communication with the relay station upon determination that the transmitted attribute of the first set of configuration parameters or the transmitted service code is included in the second set of configuration parameters and that the further information is compatible for the upcoming data session.

12. The method of claim 11, wherein the transmitted message from the relay station includes a signature applied at least on a time stamp.

13. The method of claim 1, wherein the at least one transmitted service code from the first set of configuration parameters is the result of a hashed service code of the first set combined with a transmit nonce, and the relay station further transmit the transmit nonce.

14. The method of claim 1 further comprising the secondary station informing the core network if the checking of the first core network signature fails.

15. The method of claim 1, wherein the relay station establishing a connection with the primary station includes the relay station generating a relay public encryption key and relay private encryption key, sending the relay public encryption key to the primary station for signature by the core network, and receiving in the at least one first secure message from the primary station the first set of service codes and a first core network signature based on at least the relay public encryption key.

16. The method of claim 1, wherein the secondary station establishing a connection with the primary station includes the secondary station generating a secondary station public encryption key and a secondary station private encryption key, sending the secondary public encryption key to the primary station for signature by the core network, and receiving in the at least one second secure message from the primary station the second set of service codes and a second core network signature based on at least the secondary station public encryption key.

17. A method for operating a relay station adapted for communicating in a network, including a primary station linked to a core network, said primary station serving a cell, and a secondary station served by the primary station, wherein the relay station is served by the primary station, the method comprising the steps of:

establishing, by the relay station, a connection with the primary station, including receiving in at least one first secure message from the primary station a first set of configuration parameters including a number of attributes or a set of service codes, wherein the relay station establishing a connection with the primary station includes the relay station generating a relay public encryption key and relay private encryption key, sending the relay public encryption key to the primary station for signature by the core network, and receiving in the at least one first secure message from the primary station the first set of service codes and a first core network signature based on at least the relay public encryption key, transmitting, by the relay station, at least one attribute from a second set of configuration parameters or a transmitted service code from the second set of configuration parameters, establishing, by the relay station, a direct communication with the secondary station upon request from the secondary station, said request being based on the transmitted service message.

18. A method for operating a secondary station adapted for communicating in a communication system including a primary station linked to a core network, said primary station serving a cell, a relay station served by the primary station, wherein the secondary station is served by the primary station, the method comprising the steps of:

establishing, by the secondary station, a connection with the primary station, including receiving from the primary station in at least one second secure message a public encryption key, and a second set of attributes or relay service codes linked to an upcoming data exchange with at least one relay station, wherein the secondary station establishing a connection with the primary station includes the secondary station generating a secondary station public encryption key and a secondary station private encryption key, sending the secondary public encryption key to the primary station for signature by the core network, and receiving in the at least one second secure message from the primary station the second set of service codes and a second core network signature based on at least the secondary station public encryption key, receiving, by the secondary station, at least one transmitted attribute or relay service code from the relay station, determining, by the secondary station, whether the transmitted attribute or service code is included in a second set of configuration parameters and establishing a direct communication with the relay station upon determination that the transmitted attribute or service code is included in the second set of configuration parameters or fulfills a policy in it.

19. A relay station adapted for communicating in a network, including a primary station linked to the core network, said primary station serving a cell, and a secondary station served by the primary station, wherein the relay station is served by the primary station, the relay station comprising:

a transmitter, a receiver, a controller adapted to establish a connection with the primary station, including configuring the receiver for receiving in at least one first secure message from the primary station a first set of configuration parameters including attributes or service codes, wherein the relay station establishing a connection with the primary station includes the relay station generating a relay public encryption key and relay private encryption key, sending the relay public encryption key to the primary station for signature by the core network, and receiving in the at least one first secure message from the primary station the first set of service codes and a first core network signature based on at least the relay public encryption key, the transmitter being configured for transmitting at least one transmitted attribute or service code from the first set of configuration parameters, wherein the controller is configured for establishing a direct communication with the secondary station using the public key upon request from the secondary station, said request being based on the transmitted service message.

20. A secondary station adapted for communicating in a communication system including a primary station linked to the core network, said primary station serving a cell, a relay station served by the primary station, wherein the secondary station is served by the primary station, the secondary station comprising:

a transmitter, a receiver, a controller adapted to establish a connection with the primary station, including configuring the receiver for receiving from the primary station in at least one second secure message a second set of configuration parameters including attributes or relay service codes linked to an upcoming data exchange with at least one relay station, wherein the secondary station establishing a connection with the primary station includes the secondary station generating a secondary station public encryption key and a secondary station private encryption key, sending the secondary public encryption key to the primary station for signature by the core network, and receiving in the at least one second secure message from the primary station the second set of service codes and a second core network signature based on at least the secondary station public encryption key, the receiver being adapted for receiving at least one transmitted attribute or service code from the relay station, wherein the controller is configured for determining whether the transmitted attribute or service code is included in the second set of configuration parameters or fulfill a policy in it and causing the transmitter to establish a direct communication with the relay station upon determination that the transmitted service code is included in the second set.

* * * * *